(12) United States Patent
Zhang

(10) Patent No.: US 12,511,273 B2
(45) Date of Patent: Dec. 30, 2025

(54) BLOCKCHAIN DIGITAL RESOURCE PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Yukang Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 146 days.

(21) Appl. No.: 18/487,072

(22) Filed: Oct. 14, 2023

(65) Prior Publication Data
US 2024/0037081 A1 Feb. 1, 2024

Related U.S. Application Data

(63) Continuation of application No. PCT/CN2022/133990, filed on Dec. 14, 2022.

(30) Foreign Application Priority Data
Mar. 18, 2022 (CN) .......................... 202210270443.7

(51) Int. Cl.
G06Q 20/00 (2012.01)
G06F 16/22 (2019.01)

(52) U.S. Cl.
CPC ................ G06F 16/2255 (2019.01)

(58) Field of Classification Search
CPC ...... G06F 16/2255; G06F 17/18; G06F 18/24; G06Q 10/06; G06Q 10/0639; G06Q 10/06393
(Continued)

(56) References Cited

U.S. PATENT DOCUMENTS

| 2021/0342836 A1 | 11/2021 | Cella et al. |
| 2022/0058633 A1 | 2/2022 | Yantis et al. |
| 2023/0297881 A1* | 9/2023 | Shah ...................... G06N 20/00 706/12 |

FOREIGN PATENT DOCUMENTS

| CN | 112184305 A | 1/2021 |
| CN | 113239323 A | 8/2021 |

(Continued)

OTHER PUBLICATIONS

The World Intellectual Property Organization (WIPO) International Search Report for PCT/CN2022/133990 Feb. 23, 2023 5 Pages (including translation).
(Continued)

*Primary Examiner* — Dante Ravetti
(74) *Attorney, Agent, or Firm* — Anova Law Group, PLLC

(57) ABSTRACT

A blockchain digital resource processing method, executed by a computer device, includes: determining a class label of a blockchain-based target digital resource; obtaining a resource quantitative evaluation model that matches the class label; the resource quantitative evaluation model being constructed through regression fitting based on a historical digital resource having the same class label; obtaining an evaluation characteristic factor of the target digital resource according to an input characteristic condition of the resource quantitative evaluation model; and inputting the evaluation characteristic factor into the resource quantitative evaluation model for quantitative evaluation, to obtain a quantitative evaluation result for representing an exchange attribute of the target digital resource.

20 Claims, 8 Drawing Sheets

(58) Field of Classification Search
USPC .................. 705/16, 21, 59; 380/44, 262, 278
See application file for complete search history.

(56) References Cited

FOREIGN PATENT DOCUMENTS

| | | |
|---|---|---|
| CN | 113283726 A | 8/2021 |
| CN | 113610576 A | 11/2021 |
| CN | 114118823 A | 3/2022 |

OTHER PUBLICATIONS

Maude Plante et al., "Making artworks valuable: Categorisation and modes of valuation work." Accounting, Organizations and Society 91 (2021): 101155.

Luisa Schaar et al., "Non-fungible tokens as an alternative investment: Evidence from cryptopunks." The Journal of The British Blockchain Association (2022).

\* cited by examiner

BLOCKCHAIN DIGITAL RESOURCE PROCESSING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/133990, filed on Dec. 14, 2022, which claims priority to Chinese Patent Application No. 2022102704437, entitled "BLOCKCHAIN DIGITAL RESOURCE PROCESSING METHOD AND APPARATUS, COMPUTER DEVICE, AND STORAGE MEDIUM" filed with the China National Intellectual Property Administration on Mar. 18, 2022, the entire contents of both of which are incorporated herein by reference.

FIELD OF THE TECHNOLOGY

The present disclosure relates to the field of computer technologies, and in particular, to a blockchain digital resource processing method and apparatus, a computer device, a storage medium, and a computer program product, as well as a blockchain-based resource quantitative evaluation model processing method and apparatus, a computer device, a storage medium, and a computer program product.

BACKGROUND

With the development of computer technologies, blockchain technologies characterized by resilient to data tampering and decentralization, have become the focus in the computer field. A blockchain is a chained data structure that combines data blocks in a sequentially connected manner in chronological order, and is a non-tamperable and non-forgeable distributed ledger guaranteed by cryptography. Due to the decentralized and tamper-resistant nature of the blockchain, blockchain technologies may implement reliable transfer and management of digital resources, such as digital collections.

At present, in the blockchain-based transfer and management of digital resources, it is difficult to accurately quantify and evaluate digital resources.

SUMMARY

According to various embodiments provided by the present disclosure, a blockchain digital resource processing method and apparatus, a computer device, a computer-readable storage medium, and a computer program product, as well as a blockchain-based resource quantitative evaluation model processing method and apparatus, a computer device, a storage medium, and a computer program product are provided.

According to a first aspect, the present disclosure provides a blockchain digital resource processing method. The method is executed by a computer device and includes: determining a class label of a blockchain-based target digital resource; obtaining a resource quantitative evaluation model that matches the class label; the resource quantitative evaluation model being constructed through regression fitting based on a historical digital resource having the same class label; obtaining an evaluation characteristic factor of the target digital resource according to an input characteristic condition of the resource quantitative evaluation model; and inputting the evaluation characteristic factor into the resource quantitative evaluation model for quantitative evaluation, to obtain a quantitative evaluation result for representing an exchange attribute of the target digital resource.

According to a second aspect, the present disclosure further provides a blockchain digital resource processing apparatus. The apparatus includes: a class label determination module, configured to determine a class label of a blockchain-based target digital resource; an evaluation model obtaining module, configured to obtain a resource quantitative evaluation model that matches the class label; the resource quantitative evaluation model being constructed through regression fitting based on a historical digital resource having the same class label; a characteristic factor obtaining module, configured to obtain an evaluation characteristic factor of the target digital resource according to an input characteristic condition of the resource quantitative evaluation model; and a quantitative evaluation module, configured to input the evaluation characteristic factor into the resource quantitative evaluation model for quantitative evaluation, to obtain a quantitative evaluation result for representing an exchange attribute of the target digital resource.

According to a third aspect, the present disclosure further provides a computer device. The computer device includes a memory and a processor, the memory storing computer-readable instructions, and the processor executing the computer-readable instructions to perform the following steps: determining a class label of a blockchain-based target digital resource; obtaining a resource quantitative evaluation model that matches the class label; the resource quantitative evaluation model being constructed through regression fitting based on a historical digital resource having the class label; obtaining an evaluation characteristic factor of the target digital resource according to an input characteristic condition of the resource quantitative evaluation model; and inputting the evaluation characteristic factor into the resource quantitative evaluation model for quantitative evaluation, to obtain a quantitative evaluation result for representing an exchange attribute of the target digital resource.

According to a fourth aspect, the present disclosure further provides a non-transitory computer-readable storage medium. The computer-readable storage medium stores computer-readable instructions, and the computer-readable instructions, when being executed by a processor, implement the following steps: determining a class label of a blockchain-based target digital resource; obtaining a resource quantitative evaluation model that matches the class label; the resource quantitative evaluation model being constructed through regression fitting based on a historical digital resource having the class label; obtaining an evaluation characteristic factor of the target digital resource according to an input characteristic condition of the resource quantitative evaluation model; and inputting the evaluation characteristic factor into the resource quantitative evaluation model for quantitative evaluation, to obtain a quantitative evaluation result for representing an exchange attribute of the target digital resource.

According to a fifth aspect, the present disclosure provides a blockchain-based resource quantitative evaluation model processing method. The method is executed by a computer device and includes: obtaining resource characteristic information of blockchain-based historical digital resources of a target class label; fitting based on the resource characteristic information through multiple regression fitting methods, to obtain a quantitative attribute of the historical digital resource; obtaining fitting results of the multiple regression fitting methods based on differences between history exchange attributes of the historical digital resources and quantitative attributes obtained through fitting based on the multiple regression fitting methods; selecting a target regression fitting method from the multiple regression fitting methods according to the fitting results of the multiple regression fitting methods; and constructing, based on the target regression fitting method, a resource quantitative evaluation model that matches the target class label; the resource quantitative evaluation model being used to perform quantitative evaluation on a blockchain-based target digital resource of the target class label, to obtain a quantitative evaluation result for representing an exchange attribute of the target digital resource.

According to a sixth aspect, the present disclosure further provides a blockchain-based resource quantitative evaluation model processing apparatus. The apparatus includes: a characteristic information obtaining module, configured to obtain resource characteristic information of blockchain-based historical digital resources of a target class label; a regression fitting module, configured to fit based on the resource characteristic information through multiple regression fitting methods, to obtain quantitative attributes of the historical digital resources; a fitting result obtaining module, configured to obtain fitting results of the multiple regression fitting methods based on a history exchange attribute of the historical digital resources and quantitative attributes obtained through fitting based on the multiple regression fitting methods; a fitting method selection module, configured to select a target regression fitting method from the multiple regression fitting methods according to the fitting results of the multiple regression fitting methods; and a model construction module, configured to construct, based on the target regression fitting method, a resource quantitative evaluation model that matches the target class label; the resource quantitative evaluation model being used to perform quantitative evaluation on a blockchain-based target digital resource of the target class label, to obtain a quantitative evaluation result for representing an exchange attribute of the target digital resource.

According to a seventh aspect, the present disclosure further provides a computer device. The computer device includes a memory and a processor, the memory storing computer-readable instructions, and the processor executing the computer-readable instructions to perform the following steps: obtaining resource characteristic information of a blockchain-based historical digital resource of a target class label; fitting based on the resource characteristic information through multiple regression fitting methods, to obtain a quantitative attribute of the historical digital resource; obtaining fitting results of the multiple regression fitting methods based on a history exchange attribute of the historical digital resource and quantitative attributes obtained through fitting based on the multiple regression fitting methods; selecting a target regression fitting method from the multiple regression fitting methods according to the fitting results of the multiple regression fitting methods; and constructing, based on the target regression fitting method, a resource quantitative evaluation model that matches the target class label; the resource quantitative evaluation model being used to perform quantitative evaluation on a blockchain-based target digital resource of the target class label, to obtain a quantitative evaluation result for representing an exchange attribute of the target digital resource.

According to an eighth aspect, the present disclosure further provides a non-transitory computer-readable storage medium. The computer-readable storage medium stores computer-readable instructions, and the computer-readable instructions, when being executed by a processor, implement the following steps: obtaining resource characteristic information of a blockchain-based historical digital resource of a target class label; fitting based on the resource characteristic information through multiple regression fitting methods, to obtain a quantitative attribute of the historical digital resource; obtaining fitting results of the multiple regression fitting methods based on a history exchange attribute of the historical digital resource and quantitative attributes obtained through fitting based on the multiple regression fitting methods; selecting a target regression fitting method from the multiple regression fitting methods according to the fitting results of the multiple regression fitting methods; and constructing, based on the target regression fitting method, a resource quantitative evaluation model that matches the target class label; the resource quantitative evaluation model being used to perform quantitative evaluation on a blockchain-based target digital resource of the target class label, to obtain a quantitative evaluation result for representing an exchange attribute of the target digital resource.

Details of one or more embodiments of the present disclosure are provided in the accompanying drawings and descriptions below. Other characteristics, objectives, and advantages of the present disclosure become apparent from the specification, the drawings, and the claims.

BRIEF DESCRIPTION OF THE DRAWINGS

In order to more clearly describe the technical solutions in the embodiments of the disclosure or in the related art, the drawings required for describing the embodiments or the related art will be briefly described below. Apparently, the drawings in the following description show only some of the embodiments of the disclosure.

DESCRIPTION OF EMBODIMENTS

To make the objectives, technical solutions, and advantages of the present disclosure clearer, the following further describes the present disclosure in detail with reference to the accompanying drawings and the embodiments. The specific embodiments described herein are only used for explaining the present disclosure, and are not used for limiting the present disclosure.

Figure 1:
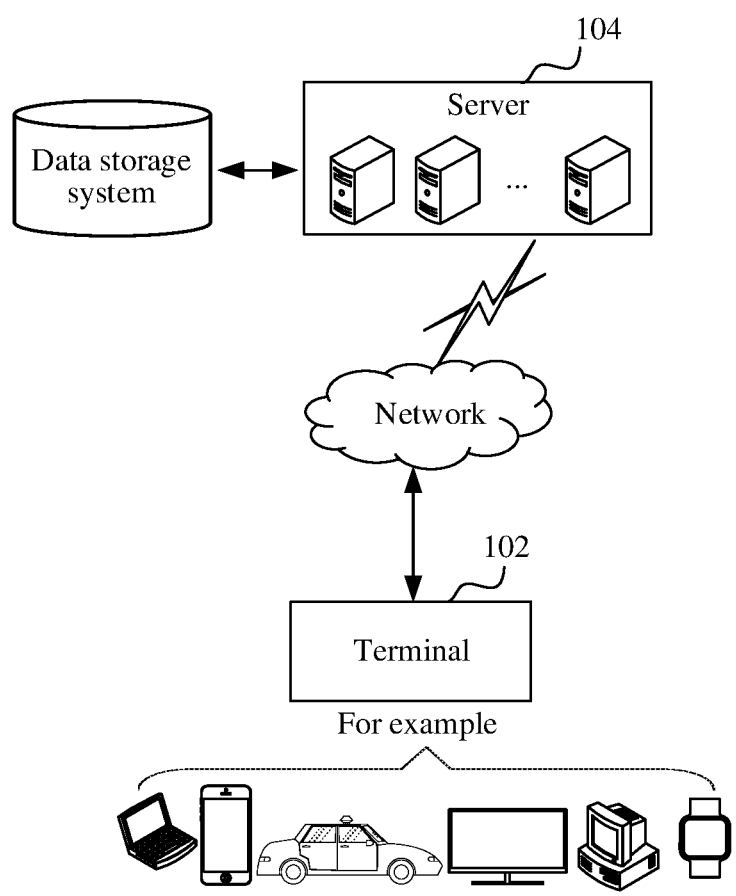
FIG. 1 is a diagram of an application environment of a blockchain digital resource processing method according to an embodiment.

A blockchain digital resource processing method provided in an embodiment of the present disclosure may be applied to an application environment shown in FIG. 1. A terminal 102 communicates with a server 104 by using a network. A data storage system may store data that needs to be processed by the server 104. The data storage system may be integrated on the server 104, or placed on the cloud or other servers. The terminal 102 may send, to the server 104, a resource identifier of a target digital resource that needs quantitative evaluation processing. After receiving the resource identifier, the server 104 determines the target digital resource that needs quantitative evaluation processing, and obtains a resource quantitative evaluation model that matches a class label of the blockchain-based target digital resource. The resource quantitative evaluation model is constructed through regression fitting based on a historical digital resource having the class label. The server 104 obtains an evaluation characteristic factor of the target digital resource according to an input characteristic condition of the resource quantitative evaluation model, inputs the evaluation characteristic factor into the resource quantitative evaluation model to perform quantitative evaluation on the target digital resource, and obtains a quantitative evaluation result representing an exchange attribute of the target digital resource.

A blockchain-based resource quantitative evaluation model processing method provided in an embodiment of the present disclosure may be applied to an application environment shown in FIG. 1. The terminal 102 may send the target class label to the server 104. The server 104 may fit based on resource characteristic information of the blockchain-based historical digital resource of the target class label through multiple regression fitting methods, to obtain a quantitative attribute of the historical digital resource, select a target regression fitting method from the multiple regression fitting methods according to fitting results of the multiple regression fitting methods obtained based on the quantitative attribute and the history exchange attribute of the historical digital resource, and construct, based on the target regression fitting method, a model for quantitative evaluation of the blockchain-based target digital resource, to obtain a resource quantitative evaluation model for representing a quantitative evaluation result of the exchange attribute of the target digital resource.

The terminal 102 may be but is not limited to various desktop computers, laptops, smartphones, tablets, IoT devices, and portable wearable devices. The IoT devices may include smart speakers, smart televisions, smart air conditioners, smart in-vehicle devices, or the like. The portable wearable devices may be smart watches, smart bracelets, head-mounted devices, and the like. The server 104 may be implemented by using an independent server or a server cluster that includes multiple servers.

Figure 2:
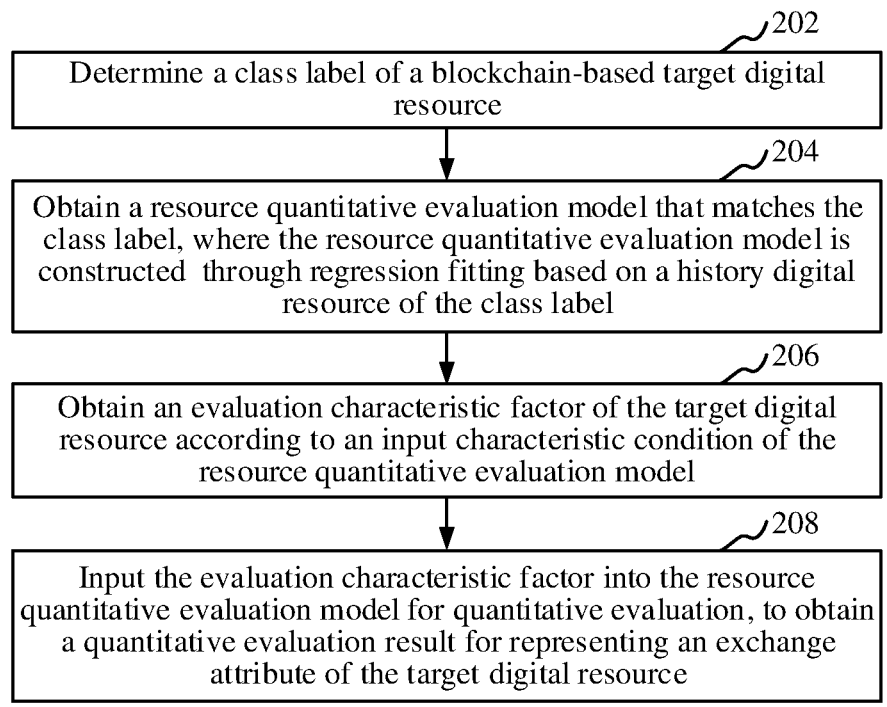
FIG. 2 is a schematic flowchart of a blockchain digital resource processing method according to an embodiment.

In an embodiment, as shown in FIG. 2, a blockchain digital resource processing method is provided. The method may be performed by a computer device. In this embodiment, for example, the method is applied to the server in FIG. 1, and the method includes the following steps.

Step 202: Determine a class label of a blockchain-based target digital resource.

A blockchain is a new application mode of computer technologies such as distributed data storage, point-to-point transmission, consensus mechanisms, and encryption algorithms. A blockchain is essentially a decentralized database and is a string of data blocks associated with cryptographic methods. Each data block includes a batch of network transaction information and is used to verify the validity of information thereof (anti-counterfeiting) and generate a next block. A blockchain may include a blockchain underlying platform, a platform product service layer, and an application service layer. Resources refer to items whose ownership may be obtained through the network, and include at least one of virtual items and physical items. The virtual item may be a digital object and specifically includes but is not limited to at least one of account values, funds, stocks, bonds, virtual image products, digital collections, virtual recharge cards, or game devices. Digital resources are digitalized resources and specifically may be digitalized assets, blockchain-based digital resources are digital resources implemented based on a blockchain and specifically may be digital assets in the blockchain, and digital assets are digital expression of assets in the blockchain, such as digital collections. Digital collections refer to unique digital certificates corresponding to specific works and artworks and generated based on the blockchain technology, and authentic and credible digital distribution, exchange, collection, and usage are implemented on the basis of protecting digital copyrights. There are many types of digital collections, including but not limited to digital pictures, music, videos, 3-dimension (3D) models, electronic tickets, digital souvenirs and other forms.

Target digital resources refer to blockchain-based digital resources that need quantitative evaluation processing. Quantitative evaluation is evaluation processing of evaluating an attribute of digital resources and obtaining a quantitative result. For example, an exchange attribute of a digital resource may be evaluated. Specifically, quantitative evaluation may be performed on numbers of exchange times, exchange cycles, exchange values, exchange platforms, and the like of digital resources. The class label is used to represent a class of the target digital resource, and the digital resource may have different representation forms, and thus correspond to different categories. For example, blockchain-based digital resources may include, but are not limited to, categories such as paintings, collections, music, sports, photography, exchangeable cards, Metaverse, and utility. Different categories of digital resources have different representations and resource characteristics, correspond to different class labels, and need to be subject to quantitative evaluation in different methods.

Specifically, when processing the blockchain digital resource, the server determines the class label of the blockchain-based target digital resource. In a specific application, the terminal may send a resource identifier of the target digital resource that needs quantitative evaluation processing to the server. After receiving the resource identifier, the server determines the blockchain-based target digital resource according to the resource identifier, and determines the class label of the target digital resource, for example, the server may obtain resource characteristic information of the target digital resource, and determine the class label of the target digital resource from the resource characteristic information, for example, when the target digital resource is a digital collection, determine that the class label of the digital collection is painting.

Step 204: Obtain a resource quantitative evaluation model that matches the class label. The resource quantitative evaluation model is constructed through regression fitting based on a historical digital resource having the class label.

The resource quantitative evaluation model is constructed through regression fitting based on a historical digital resource having the class label. The historical digital resource and the target digital resource are of the same class label, that is, the historical digital resource and the target digital resource have the same form of expression, and the historical digital resource is a digital resource that has a corresponding real result of quantitative evaluation. For example, when the quantitative evaluation of the target digital resource aims at the exchange value, the historical digital resource may be a digital resource that has undergone at least one exchange and has a definite exchange price, and the historical digital resource and the target digital resource are of the same class label. Regression fitting refers to the fitting processing using regression algorithms, such as linear regression, logistic regression, polynomial regression, stepwise regression, lasso regression, hedonic regression and other regression algorithms. Fitting is a process of connecting data through a smooth curve. The connected curve may be expressed by a function, so that a model may be constructed based on the function. The resource quantitative evaluation model is constructed through regression fitting of historical digital resources of the same class label, that is, the resource quantitative evaluation model matches the class label, and different class labels match different resource quantitative evaluation models. The resource quantitative evaluation model may perform quantitative evaluation on digital resources of a matched class label, so as to obtain quantitative evaluation results of the digital resources.

Specifically, after determining the class label of the target digital resource, the server further obtains a resource quantitative evaluation model that matches the class label. The resource quantitative evaluation model is constructed through regression fitting based on a historical digital resource having the class label. In a specific implementation, the server may perform regression fitting based on the historical digital resources of the class label to construct the resource quantitative evaluation model, and then establish a matching relationship between the resource quantitative evaluation model and the class label, and after determining the class label of the target digital resource, query the matching relationship through the class label, so as to determine a resource quantitative evaluation model that matches the class label of the target digital resource, so as to perform quantitative evaluation processing on the target digital resource through the resource quantitative evaluation model.

Step 206: Obtain an evaluation characteristic factor of the target digital resource according to an input characteristic condition of the resource quantitative evaluation model.

The input characteristic condition refers to a limiting condition of an inputted characteristic that the resource quantitative evaluation model performs quantitative evaluation on. By inputting a characteristic that satisfies the input characteristic condition, the resource quantitative evaluation model may perform quantitative evaluation processing on the inputted characteristic. The input characteristic condition may be correspondingly set according to each class of resource quantitative evaluation model, that is, resource quantitative evaluation models matching different class labels may have different input characteristic conditions. The evaluation characteristic factor is the characteristic of the target digital resource, and is inputted to the resource quantitative evaluation model for quantitative evaluation processing. The evaluation characteristic factor may be obtained according to the input characteristic condition of the resource quantitative evaluation model. For example, the input characteristic condition may define a field of a characteristic and a format of a characteristic of each field, and then the field of the characteristic of the target digital resource and the format of the characteristic of each field may be determined according to the input characteristic condition, so as to obtain the evaluation characteristic factor of the target digital resource in a combined manner.

Specifically, the server queries the input characteristic condition of the resource quantitative evaluation model, and different resource quantitative evaluation models may correspond to different input characteristic conditions. The server obtains the evaluation characteristic factor of the target digital resource according to the queried input characteristic condition. For example, the server may obtain resource characteristic information of the target digital resource, and extract the evaluation characteristic factor from the resource characteristic information of the target digital resource according to the input characteristic condition.

Step 208: Input the evaluation characteristic factor into the resource quantitative evaluation model for quantitative evaluation, to obtain a quantitative evaluation result for representing an exchange attribute of the target digital resource.

Quantitative evaluation is an evaluation processing process of evaluating an attribute of a digital resource to obtain a quantitative result, that is, quantitative evaluation may evaluate the exchange attribute of the target digital resource, and obtain an evaluation result that quantifies the exchange attribute of the target digital resource. For example, the exchange attribute may be an exchange value, and the quantitative evaluation may be a processing process of classifying the exchange value of the target digital resource as one of five preset grades, so as to classify the exchange value of the target digital resource as a grade that the value belongs to. The exchange attribute is attribute information in resource exchange with the target digital resource, for example, may include an exchange value, an exchange price, a number of exchange times, and an exchange platform. The exchange value may be a potential value of the target digital resource, and the exchange price may be a price during the actual exchange process, and the exchange price may reflect the exchange value of the target digital resource to a certain extent. The specific class of the exchange attribute is related to a parameter of regression fitting when constructing the resource quantitative evaluation model based on regression fitting. If the regression fitting aims at the exchange price, the exchange attribute in the quantitative evaluation result is also the exchange price. The quantitative evaluation result is an evaluation result obtained from the quantitative evaluation of the target digital resource. The quantitative evaluation result may represent the exchange attribute of the target digital resource, for example, may represent the exchange value of the target digital resource.

Specifically, after obtaining the evaluation characteristic factor of the target digital resource, the server inputs the evaluation characteristic factor of the target digital resource into the resource quantitative evaluation model to perform quantitative evaluation on the target digital resource, and the resource quantitative evaluation model outputs the quantitative evaluation result of the target digital resource. The quantitative evaluation result is used to represent the exchange attribute of the target digital resource, so as to implement quantitative evaluation processing of the exchange attribute of the target digital resource.

In the blockchain digital resource processing method, a resource quantitative evaluation model that matches a class label of the blockchain-based target digital resource is obtained, where the resource quantitative evaluation model is constructed through regression fitting based on a historical digital resource having the class label, an evaluation characteristic factor of the target digital resource is obtained according to an input characteristic condition of the resource quantitative evaluation model, and the evaluation characteristic factor is inputted into the resource quantitative evaluation model to perform quantitative evaluation on the target digital resource. Quantitative evaluation is performed on the target digital resource based on the evaluation characteristic factor determined by the resource quantitative evaluation model constructed through regression fitting of historical digital resources of the same class label. In this way, quantitative evaluation may be performed on the target digital resource based on exchange attributes of historical digital resources of the same class label, which improves the accuracy of quantitative evaluation of blockchain digital resources.

Figure 3:
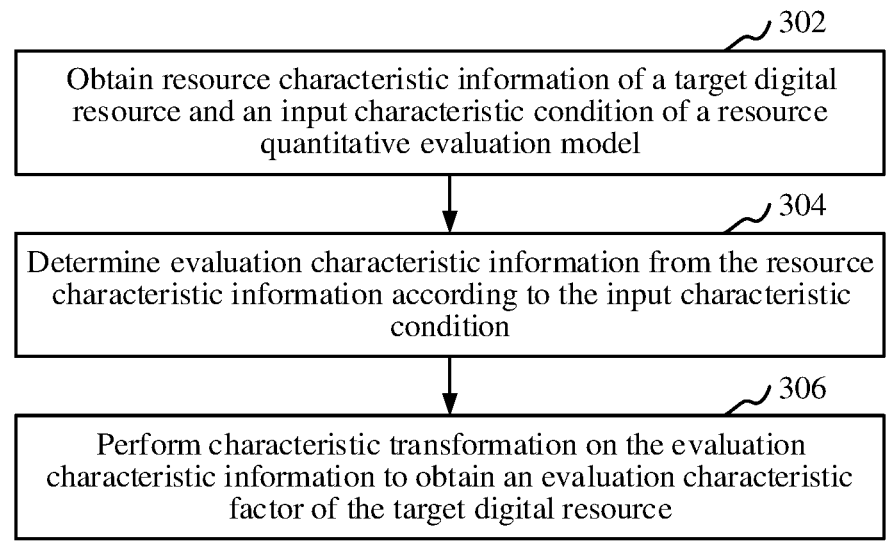
FIG. 3 is a schematic flowchart of obtaining an evaluation characteristic factor according to an embodiment.

In an embodiment, as shown in FIG. 3, the processing of obtaining an evaluation characteristic factor, that is, obtaining the evaluation characteristic factor of the target digital resource according to the input characteristic condition of the resource quantitative evaluation model, includes:

Step 302: Obtain resource characteristic information of the target digital resource and an input characteristic condition of the resource quantitative evaluation model.

The resource characteristic information is information related to the characteristic of the target digital resource, and may specifically include description information and transfer information of the target digital resource. The description information is information describing the resource characteristic of the target digital resource, and may specifically include creation information and attribute information of the target digital resource. The creation information is information associated with the creation of the target digital resource, such as a creation time, an on-chain time, and creator information of the target digital resource, and the attribute information is information associated with the resource attribute of the target digital resource, such as an attribute name, an attribute appearance probability, a resource expression form, and a resource subject included in the target digital resource. The transfer information is information about transfer of the target digital resource during the exchange process, such as an exchange time, an exchange price, information of two exchange parties, a number of exchange times, an exchange platform, blockchain information, and exchange background information of the target digital resource. Since the blockchain-based target digital resource is transparent and non-tamperable, the resource characteristic information of the target digital resource may be obtained by tracing the resource transfer history record of the target digital resource, that is, the exchange record of the target digital resource. The input characteristic condition corresponds to the resource quantitative evaluation model, different resource quantitative evaluation models may have different input characteristic conditions, and the input characteristic condition may be correspondingly generated when constructing the resource quantitative evaluation model.

Specifically, the server obtains the input characteristic condition of the resource quantitative evaluation model, for example, may query, based on a model identifier of the resource quantitative evaluation model, the input characteristic condition that matches the resource quantitative evaluation model. When obtaining the resource characteristic information of the target digital resource, the server may specifically trace the exchange record of the target digital resource, so as to obtain the resource characteristic information of the target digital resource. In addition, when the resource characteristic information of the target digital resource exists on a third-party platform, the resource characteristic information of the target digital resource may also be queried from the third-party platform based on the resource identifier of the target digital resource.

Step 304: Determine evaluation characteristic information from the resource characteristic information according to the input characteristic condition.

The evaluation characteristic information is resource characteristic information that satisfies the input characteristic condition and that is of the resource characteristic information of the target digital resource, that is, the evaluation characteristic information is resource characteristic information selected from the resource characteristic information according to the input characteristic condition and used for quantitative evaluation of the target digital resource.

Specifically, the server screens the resource characteristic information of the target digital resource according to the input characteristic condition, to obtain the evaluation characteristic information that satisfies the input characteristic condition. During specific implementation, the input characteristic condition may include an information type of the resource characteristic information used for quantitative evaluation, and the server may determine the evaluation characteristic information from the resource characteristic information according to the information type.

Step 306: Perform characteristic conversion on the evaluation characteristic information to obtain an evaluation characteristic factor of the target digital resource.

The characteristic conversion is data format conversion of the evaluation characteristic information, so as to convert the evaluation characteristic information into the evaluation characteristic factor of the target digital resource. Specifically, the server may perform characteristic conversion on the obtained evaluation characteristic information, for example, quantify the evaluation characteristic information to obtain the evaluation characteristic factor of the target digital resource. During specific implementation, for different information types of evaluation characteristic information, corresponding evaluation characteristic factors may be obtained through different quantification processing. For example, the server may quantify an on-chain time of the target digital resource into an on-chain time characteristic factor in a fixed time expression format, where the specific format may be "year-month-day hour: minute: second". For another example, the server may quantify the exchange platform of the target digital resource into a matched exchange platform identifier to obtain the exchange platform characteristic factor. Specifically, an exchange platform 1 may be quantified into "001", and an exchange platform 2 may be quantified into "002", so that the exchange platform of the target digital resource is represented by the exchange platform characteristic factor. After performing characteristic conversion on each evaluation characteristic information, the server obtains the evaluation characteristic factor of the target digital resource according to the characteristic conversion result of each evaluation characteristic information, that is, the evaluation characteristic factor of the target digital resource includes the characteristic conversion result of each evaluation characteristic information.

In this embodiment, according to the input characteristic condition of the resource quantitative evaluation model, the evaluation characteristic information is determined from the resource characteristic information of the target digital resource, and the obtained evaluation characteristic information is subject to characteristic conversion to obtain the evaluation characteristic factor of the target digital resource, thereby accurately determining the evaluation characteristic factor of the target digital resource according to the resource quantitative evaluation model, so as to perform quantitative evaluation based on the inputted evaluation characteristic factor through the resource quantitative evaluation model, so as to ensure the accuracy of quantitative evaluation.

In an embodiment, the performing characteristic conversion on the evaluation characteristic information to obtain an evaluation characteristic factor of the target digital resource includes: performing quantitative processing on evaluation characteristic information satisfying a data continuity condition in the evaluation characteristic information, to obtain a continuous evaluation characteristic factor; performing quantitative processing on evaluation characteristic information not satisfying a data continuity condition in the evaluation characteristic information, to obtain a discontinuous evaluation characteristic factor; and obtaining the evaluation characteristic factor of the target digital resource according to the continuous evaluation characteristic factor and the discontinuous evaluation characteristic factor.

Quantitative evaluation is performed on characteristic information of different characteristics in the evaluation characteristic information in different manners, to obtain evaluation characteristic factors in different data formats. The data continuity condition is used to determine a quantification method of the evaluation characteristic information. Specifically, when the evaluation characteristic information satisfies data continuity, it is considered that the evaluation characteristic information satisfies the data continuity condition. For example, if a resource subject in the evaluation characteristic information of the target digital resource is discontinuous data, it may be considered that the resource subject does not satisfy the data continuity condition. Another example is to evaluate the exchange price in the characteristic information. If the exchange price is continuous data, it may be considered that the exchange price satisfies the data continuity condition. The continuous evaluation characteristic factor is a characteristic factor with continuous data, while the discontinuous evaluation characteristic factor is a characteristic factor with discontinuous data.

Specifically, during the characteristic conversion process of the evaluation characteristic information, the server determines the data continuity condition, compares the evaluation characteristic information with the data continuity condition, and performs quantitative evaluation on evaluation characteristic information that is of the evaluation characteristic information and that satisfies the data continuity condition, to obtain the continuous evaluation characteristic factor, such as, to obtain a continuous evaluation characteristic factor in a continuous data format. The server performs quantitative processing on evaluation characteristic information not satisfying a data continuity condition in the evaluation characteristic information, to obtain a discontinuous evaluation characteristic factor. The server obtains the evaluation characteristic factor of the target digital resource according to the continuous evaluation characteristic factor and the discontinuous evaluation characteristic factor, that is, the evaluation characteristic factor of the target digital resource includes the continuous evaluation characteristic factor and the discontinuous evaluation characteristic factor.

In this embodiment, quantitative processing is performed on the evaluation characteristic information that satisfies the data continuity condition, to obtain a continuous evaluation characteristic factor, and quantitative processing is performed on the evaluation characteristic information not satisfying the data continuity condition, to obtain a discontinuous evaluation characteristic factor, so that corresponding quantitative processing is performed according to the data continuity characteristic of the evaluation characteristic information, which improves the characteristic expression ability of the evaluation characteristic factor of the target digital resource, and is conducive to improving the accuracy of the quantitative evaluation based on the evaluation characteristic factor.

In an embodiment, the determining a class label of a blockchain-based target digital resource includes: determining the blockchain-based target digital resource to be evaluated; and obtaining attribute information of the target digital resource, and determining a class label of the target digital resource according to the attribute information.

The target digital resource is a digital resource that needs quantitative evaluation processing, and the attribute information is the information associated with the resource attribute of the target digital resource, such as an attribute name, an attribute appearance probability, a resource expression form, and a resource subject included in the target digital resource.

Specifically, the server determines the blockchain-based target digital resource to be evaluated. When a quantitative processing event is triggered by the terminal, the terminal may send the resource identifier of the blockchain-based target digital resource to the server, to indicate that the terminal requests the server to perform quantitative evaluation processing on the target digital resource associate with the resource identifier. After receiving the resource identifier, the server queries, based on the resource identifier, the blockchain-based target digital resource to be evaluated. The server obtains the attribute information of the target digital resource. Specifically, the server may obtain the resource characteristic information of the target digital resource, and extract the attribute information of the target digital resource from the resource characteristic information, and the server determines the class label of the target digital resource according to the attribute information. During specific implementation, the server may determine the resource representation form of the target digital resource from the attribute information, and determine the matched class label based on the resource representation form of the target digital resource, such as painting, collection, music, sports, photography, exchangeable cards, Metaverse, utility, and other class labels.

In this embodiment, the server determines the class label of the target digital resource according to the attribute information of the target digital resource, and performs quantitative evaluation on the target digital resource through a resource quantitative evaluation model that matches the class label, which improves the accuracy of quantitative evaluation of blockchain digital resources.

In an embodiment, the resource quantitative evaluation model is obtained through operations of model construction, and the operations of model construction include: obtaining resource characteristic information of a historical digital resource having the class label; fitting based on the resource characteristic information through multiple regression fitting methods, to obtain a quantitative attribute of the historical digital resource; obtaining fitting results of the multiple regression fitting methods based on a history exchange attribute of the historical digital resource and quantitative attributes obtained through fitting based on the multiple regression fitting methods; selecting a target regression fitting method from the multiple regression fitting methods according to the fitting results of the multiple regression fitting methods; and constructing, based on the target regression fitting method, a resource quantitative evaluation model.

The historical digital resource and the target digital resource are of the same class label, that is, the historical digital resource and the target digital resource have the same form of expression, and the historical digital resource is a digital resource that has a corresponding real result of quantitative evaluation. For example, when the quantitative evaluation of the digital resource aims at the exchange value, the historical digital resource may be a digital resource that has undergone at least one exchange and has a definite exchange price. The regression fitting method is a fitting method for fitting the historical digital resource through a specific regression algorithm. The quantitative attribute is a quantitative attribute obtained by regression fitting of the historical digital resource. The quantitative attribute may be set according to actual quantitative evaluation needs, and may be specifically an exchange attribute of the historical digital resource, such as an exchange value, an exchange price, an exchange time, an exchange platform, or the number of exchange times.

A history exchange attribute is a real exchange attribute of the historical digital resource during the history exchange process. The fitting results are used to represent the fitting degrees of multiple regression fitting methods. The target regression fitting method is a regression fitting method selected from multiple regression fitting methods based on the fitting results of the multiple regression fitting methods to construct a resource quantitative evaluation model. The resource quantitative evaluation model is used to perform quantitative evaluation on a blockchain-based target digital resource, to obtain a quantitative evaluation result for representing an exchange attribute of the target digital resource.

Specifically, the server obtains the resource characteristic information of the blockchain-based historical digital resource of the class label. Specifically, the server may obtain the blockchain-based historical digital resource of the class label. The server traces the exchange record of the historical digital resource to obtain resource characteristic information of the historical digital resource. The server obtains quantitative attributes of historical digital resources through fitting based on resource characteristic information through multiple regression fitting methods, and the quantitative attributes are fitting attributes obtained by regression fitting of historical digital resources through corresponding regression fitting methods. The server obtains fitting results of the multiple regression fitting methods by comparing a history exchange attribute of the historical digital resource with quantitative attributes obtained through fitting based on the multiple regression fitting methods. The fitting results reflect the fitting degrees of the regression fitting methods. The fitting result may specifically be the goodness of fit, and the statistic to measure the goodness of fit is a coefficient of determination (also known as the determination coefficient) $R^2$. The maximum value of $R^2$ is 1, and the closer the value of $R^2$ is to 1, the better the fitting degree. Conversely, the smaller the value of $R^2$, the worse the fitting degree.

The server screens the multiple regression fitting methods according to the fitting results of the multiple regression fitting methods, so as to select the target regression fitting method from the multiple regression fitting methods. In a specific implementation, the fitting result may include the goodness of fit $R^2$, and the server may determine the goodness of fit $R^2$ with the largest value from the goodness of fit $R^2$ corresponding to the multiple regression fitting methods, and determine a regression fitting method matching the goodness of fit $R^2$ with the largest value as the target regression fitting method, so that the target regression fitting method is selected from multiple regression fitting methods. After selecting the target regression fitting method, the server constructs, based on the target regression fitting method, a resource quantitative evaluation model that matches the class label. Specifically, the server may construct an initial resource quantitative evaluation model through the target regression fitting method, train the initial resource quantitative evaluation model through the historical digital resource having the class label, and after training, obtain a resource quantitative evaluation model that matches the class label. The resource quantitative evaluation model may be used to perform quantitative evaluation on a blockchain-based target digital resource of the class label, to obtain a quantitative evaluation result for representing an exchange attribute of the target digital resource.

In this embodiment, fitting is performed based on resource characteristic information of the blockchain-based historical digital resource of the class label through multiple regression fitting methods, to obtain a quantitative attribute of the historical digital resource, a target regression fitting method is selected from the multiple regression fitting methods according to fitting results of the multiple regression fitting methods obtained based on the quantitative attribute and the history exchange attribute of the historical digital resource, and a model for quantitative evaluation of the blockchain-based target digital resource is constructed based on the target regression fitting method, to obtain a resource quantitative evaluation model for representing a quantitative evaluation result of the exchange attribute of the target digital resource. The blockchain-based historical digital resource of the same class label is fitted through multiple regression fitting methods, and the target regression fitting method for constructing a resource quantitative evaluation model is selected from multiple regression fitting methods according to the fitting results. In this way, the constructed resource quantitative evaluation model may perform quantitative evaluation on the target digital resource based on exchange attributes of historical digital resources of the same class label, thereby improving the accuracy of quantitative evaluation of blockchain digital resources.

In an embodiment, the fitting based on the resource characteristic information through multiple regression fitting methods, to obtain a quantitative attribute of the historical digital resource includes: performing quantitative processing on resource characteristic information to obtain resource characteristic factors; testing the resource characteristic factors and obtaining a target characteristic factor from the resource characteristic factors based on a test result; and fitting based on the target characteristic factor through multiple regression fitting methods, to obtain a quantitative attribute of the historical digital resource.

The resource characteristic factor is a characteristic factor obtained by quantifying the resource characteristic information. A data format of the resource characteristic factor matches a corresponding type of resource characteristic information. By performing quantitative processing on the resource characteristic information, a format of the same type of resource characteristic information may be unified, which helps to ensure the accurate expression of resource characteristics. The target characteristic factor is a characteristic factor used for regression fitting processing and selected from resource characteristic factors through testing.

Specifically, the server performs quantitative processing on resource characteristic information, and different quantitative processing may be performed on different types of resource characteristic information to obtain resource characteristic factors. For example, for resource characteristic information with data continuity, the server performs continuous quantification on this type of resource characteristic information, so as to quantify this type of resource characteristic information into a continuous resource characteristic factor. For resource characteristic information without data continuity, the server performs discontinuous quantification on this type of resource characteristic information to quantify this type of resource characteristic information into a discontinuous resource characteristic factor. The server obtains the resource characteristic factor based on the continuous resource feature factor and the discontinuous resource characteristic factor. The server tests the obtained resource characteristic factor to ensure the validity of the resource characteristic factor, which may be used for accurate quantitative evaluation of digital resources. The server may specifically analyze the validity of each resource characteristic factor to test the resource characteristic factor, and the server may screen the resource characteristic factors according to test results of the resource characteristic factors to obtain the target characteristic factor that may be used for accurate quantitative evaluation of digital resources. The target characteristic factor may affect quantitative evaluation results of digital resources, and therefore it is necessary to introduce the target characteristic factor to ensure the accuracy of quantitative evaluation of digital resources. The server fits based on the target characteristic factor through multiple regression fitting methods, to obtain a quantitative attribute of the historical digital resource. For example, the server may use multiple regression fitting methods and respectively use the target characteristic factor as an independent variable of the fitting and use the quantitative attribute of the historical digital resource as a dependent variable of the fitting, so as to obtain the quantitative attribute of the historical digital resource through fitting based on the target characteristic factor.

In this embodiment, by performing quantitative processing on the resource characteristic information, a format of the same type of resource characteristic information is unified, which helps to ensure the accurate expression of resource characteristics. Further, the target characteristic factor may be selected through the testing of the resource characteristic factor and the quantitative attribute of the historical digital resource may be obtained by fitting through multiple regression fitting methods, which can ensure the validity of the target characteristic factor in the fitting process, thereby ensuring that the constructed resource quantitative evaluation model can accurately perform quantitative evaluation on blockchain digital resources.

In an embodiment, the testing the resource characteristic factors and obtaining a target characteristic factor from the resource characteristic factors based on a test result includes: performing variance analysis on the resource characteristic factors to obtain a variance analysis result; and determining a resource characteristic factor of the resource characteristic factors whose variance analysis result satisfies a factor validity determination condition as the target characteristic factor.

Variance analysis is to analyze the resource characteristic factor, test whether multiple normal overall means with equal variances are equal, and then determine whether each resource characteristic factor has a significant impact on a fitting attribute of a digital resource. Variance analysis may be divided into one-way analysis of variance, two-way analysis of variance, and multi-way analysis of variance according to the number of factors affecting the fitting attribute. A variance analysis result is an analysis result obtained by performing variance analysis on resource characteristic factors respectively, and the variance analysis result represents a degree of impact of the resource characteristic factor on the fitting attribute of the digital resource. Specifically, one-way analysis of variance may be performed on resource characteristic factors to obtain a result of one-way analysis of variance. The factor validity determination condition is used to determine whether the resource characteristic factor can effectively affect the fitting attributes of digital resources, so as to obtain the target characteristic factor from resource characteristic factors.

Specifically, when the resource characteristic factors are tested to select the target characteristic factor from the resource characteristic factors, the server may perform variance analysis on the resource characteristic factors, and specifically may perform one-way analysis of variance on the resource characteristic factors to obtain a variance analysis result. The server determines the preset factor validity determination condition, compares the variance analysis result of each resource characteristic factor with the factor validity determination condition, so as to determine a resource characteristic factor whose variance analysis result satisfies the factor validity determination condition, and determines the resource characteristic factor whose variance analysis result satisfies the factor validity determination condition as the target characteristic factor. In a specific application, the server may perform one-way analysis of variance on the resource characteristic factors to obtain a ratio F between an inter-group mean square and an intra-group mean square and a confidence interval P for testing the statistic F. The server compares the value F and the value P with a target value F and a target value P in the factor validity determination condition, if the value F is not less than the target value F and the value P is less than the target value P, it is considered that the corresponding resource characteristic factor satisfies the factor validity determination condition, and the resource characteristic factor is determined as the target characteristic factor.

In this embodiment, variance analysis is performed on the resource characteristic factors, and the target characteristic factor is determined from the resource characteristic factors based on the variance analysis result and the factor validity determination condition. In this way, the target characteristic factor affecting the fitting attribute of the digital resource can be accurately determined from the resource characteristic factors. Fitting is performed through multiple regression fitting methods based on the target characteristic factor to obtain the quantitative attributes of historical digital resources, which can ensure the validity of the target characteristic factor in the fitting process, thereby ensuring that the constructed resource quantitative evaluation model can accurately perform quantitative evaluation on blockchain digital resources.

In an embodiment, the obtaining fitting results of the multiple regression fitting methods based on a history exchange attribute of the historical digital resource and quantitative attributes obtained through fitting based on the multiple regression fitting methods includes: obtaining fitting degree parameters of the multiple regression fitting methods based on differences between a history exchange attribute of the historical digital resource and quantitative attributes obtained through fitting based on the multiple regression fitting methods.

The fitting result reflects the fitting degree of the regression fitting method, and the fitting result specifically includes a fitting degree parameter and is used to reflect the quantitative fitting degree of the regression fitting method. Specifically, the fitting degree parameter may be at least one of the goodness of fit $R^2$, the adjusted goodness of fit adjusted-$R^2$, and the variance test value F.

Specifically, the server calculates fitting degree parameters of the multiple regression fitting methods based on differences between a history exchange attribute of the historical digital resource and quantitative attributes obtained through fitting based on the multiple regression fitting methods, for example, calculates adjusted goodness of fit adjusted-$R^2$.

Further, the selecting a target regression fitting method from the multiple regression fitting methods according to the fitting results of the multiple regression fitting methods includes: determining a target fitting degree parameter that satisfies a model construction condition from fitting degree parameters of the multiple regression fitting methods; and determining a regression fitting method of the multiple regression fitting methods that matches the target fitting degree parameter as the target regression fitting method.

The model construction condition is a preset condition for selecting the regression fitting method based on the fitting degree parameter, so as to select the target regression fitting method for constructing the resource quantitative evaluation model from multiple regression fitting methods. Specifically, the model construction condition may include a fitting degree threshold to screen the regression fitting methods by comparing the fitting degree threshold with the fitting degree parameter. For example, when the fitting degree parameter is the goodness of fit $R^2$, the model construction condition may be that the goodness of fit $R^2$ exceeds a goodness of fit threshold.

Specifically, the server determines the preset model construction condition, and determines a target fitting degree parameter that satisfies the model construction condition from fitting degree parameters of the multiple regression fitting methods. After determining the target fitting degree parameter, the server determines a regression fitting method that matches the target fitting degree parameter from multiple regression fitting methods, and determines the regression fitting method as the target regression fitting method, to select the target regression fitting method for constructing the resource quantitative evaluation model from the multiple regression fitting methods.

In this embodiment, the fitting degree parameters of the regression fitting methods are calculated according to the differences between the quantitative attributes and the history exchange attribute, the target fitting degree parameter is determined from the fitting degree parameters based on the model construction condition, and the regression fitting method that matches the target fitting degree parameter is determined as the target regression fitting method. Therefore, selection is performed based on the fitting degrees of the regression fitting methods, to obtain the target regression fitting method for constructing the resource quantitative evaluation model, thereby ensuring that the constructed resource quantitative evaluation model can accurately perform quantitative evaluation on blockchain digital resources.

In an embodiment, the obtaining resource characteristic information of a historical digital resource having the class label includes: determining the historical digital resource having the class label, and obtaining description information of the historical digital resource; tracing a resource transfer history record of the historical digital resource in a target blockchain to which the historical digital resource belongs, to obtain transfer information of the historical digital resource; and obtaining resource characteristic information of the historical digital resource according to the description information and the transfer information.

The resource characteristic information of the historical digital resource is information related to the characteristic of the historical digital resource, and may specifically include description information and transfer information of the historical digital resource. The description information is information describing the resource characteristic of the historical digital resource, and may specifically include creation information and attribute information of the historical digital resource. The creation information is information associated with the creation of the historical digital resource, and the attribute information is information associated with the resource attribute of the historical digital resource. The transfer information is information about transfer of the historical digital resource during the exchange process, such as an exchange time, an exchange price, information of two exchange parties, a number of exchange times, an exchange platform, blockchain information, and exchange background information of the historical digital resource. Since the blockchain-based digital resource is transparent and non-tamperable, the resource characteristic information of the historical digital resource may be obtained by tracing the resource transfer history record of the historical digital resource, that is, the exchange record of the historical digital resource.

Specifically, when the server obtains the resource characteristic information of the historical digital resource having the class label, the server determines the historical digital resource having the class label, and obtains the description information of the historical digital resource, and specifically may obtain creation information such as a creation time, an on-chain time, and creator information of the historical digital resource, and attribute information such as an attribute name, an attribute appearance probability, a resource expression form, and a resource subject included in the historical digital resource. Further, the server determines the target blockchain to which the historical digital resource belongs, and traces the resource transfer history record of the historical digital resource in the target blockchain, that is, traces the exchange record of the historical digital resource, so as to obtain the transfer information of the historical digital resource, such as an exchange time, an exchange price, information of two exchange parties, a number of exchange times, an exchange platform, blockchain information, and exchange background information of the historical digital resource. According to the description information and the transfer information of the historical digital resource, the server obtains the resource characteristic information of the historical digital resource.

In this embodiment, the resource transfer history record of the historical digital resource is traced in the target blockchain to which the historical digital resource belongs, so that the transfer information of historical digital resource is obtained, and resource characteristic information of the historical digital resource is obtained in combination with the description information of the historical digital resource, so that the characteristic information related to the historical digital resource may be fully mined, which is conducive to ensuring that the constructed resource quantitative evaluation model can accurately perform quantitative evaluation on blockchain digital resources.

In an embodiment, the tracing a resource transfer history record of the historical digital resource in a target blockchain to which the historical digital resource belongs, to obtain transfer information of the historical digital resource includes: obtaining current address information of the historical digital resource in the target blockchain to which the historical digital resource belongs; determining a current block to which the current address information belongs; tracing a generation record of the current block in the target blockchain to obtain a resource transfer history record of the historical digital resource; and obtaining the transfer information of the historical digital resource according to the resource transfer history record.

The target blockchain is a blockchain to which the historical digital resource belongs, that is, the historical digital resource is recorded on the target blockchain. The current address information is a current location of the historical digital resource in the target blockchain, and specifically may be a wallet address of the target blockchain. The current block is a block where the historical digital resource is located in the target blockchain. The resource transfer history record is record information about the transfer of the historical digital resource during the exchange process.

Specifically, when obtaining the transfer information of the historical digital resource, the server obtains the current address information of the historical digital resource in the target blockchain to which the historical digital resource belongs, to determine the current location of the historical digital resource, and the server determines, based on the current address information of the historical digital resource, the current block to which the historical digital resource belongs, and traces the generation record of the current block in the target blockchain, and may specifically backtrace the generation record of the current block to obtain the resource transfer history record of the historical digital resource. The server obtains the transfer information of the historical digital resource according to the resource transfer history record of the historical digital resource.

In this embodiment, the generation record of the current block is traced according to the current block to which the historical digital resource belongs in the target blockchain, so as to obtain the transfer information of the historical digital resource according to the traced resource transfer history record, which can fully mine the transfer information related to the historical digital resource, which is conducive to ensuring that the constructed resource quantitative evaluation model can accurately perform quantitative evaluation on blockchain digital resources.

In an embodiment, the constructing a resource quantitative evaluation model based on the target regression fitting method includes: constructing, based on the target regression fitting method, an initial resource quantitative evaluation model; and training the initial resource quantitative evaluation model based on the resource characteristic information of the historical digital resource until the training ends, to obtain the resource quantitative evaluation model.

The initial resource quantitative evaluation model is an initialization model constructed based on the target regression fitting method, and the initial resource quantitative evaluation model may be trained based on the resource characteristic information of the historical digital resource, to construct the resource quantitative evaluation model. Specifically, when constructing the resource quantitative evaluation model, the server may construct the initial resource quantitative evaluation model based on the target regression fitting method, for example, construct the initial resource quantitative evaluation model based on a function form corresponding to the target regression fitting method. The server trains the initial resource quantitative evaluation model based on the resource characteristic information of the historical digital resource until the training ends, to obtain the resource quantitative evaluation model.

In this embodiment, the initial resource quantitative evaluation model is constructed based on the target regression fitting method, and the initial resource quantitative evaluation model is trained through the resource characteristic information of the historical digital resource, so that the resource quantitative evaluation model may be constructed. In this way, the constructed resource quantitative evaluation model may perform quantitative evaluation on the target digital resource based on the exchange attribute of the historical digital resource of the same class label, thereby improving the accuracy of quantitative evaluation of blockchain digital resources.

In an embodiment, a blockchain digital resource processing method further includes: obtaining verification resource characteristic information of a verification resource group of the class label; performing model verification on the resource quantitative evaluation model based on the verification resource characteristic information and a model verification condition, to obtain a model verification result; and returning to the step of constructing the resource quantitative evaluation model based on the target regression fitting method in response to that the model verification result is that the testing fails, until the resource quantitative evaluation model passes the model verification.

The verification resource group is a digital resource of the same class label as the target digital resource, and is used to perform model verification on the constructed resource quantitative evaluation model, so as to ensure the validity of the constructed resource quantitative evaluation model. The verification resource group may be a historical digital resource obtained through division to perform model verification of the constructed resource quantitative evaluation model. The verification resource characteristic information is resource characteristic information of the verification resource group. The model verification condition may include various verification methods and matched verification indicators, such as multicollinearity verification, residual normality verification, and random errorterm autocorrelation verification.

Specifically, after the resource quantitative evaluation model is constructed, the server obtains the verification resource characteristic information of the verification resource group of the class label, and determines the model verification condition of the resource quantitative evaluation model. The server performs model verification on the resource quantitative evaluation model based on the verification resource characteristic information and the model verification condition, to obtain a model verification result. When the server determines that the model verification result is that verification fails, the server returns to the step of constructing the resource quantitative evaluation model based on the target regression fitting method, to reconstruct the resource quantitative evaluation model until the constructed resource quantitative evaluation model passes the model verification. When the server determines that the model test result is that test succeeds, it indicates that the constructed resource quantitative evaluation model can accurately and effectively perform quantitative evaluation on the digital resources, and the server determines that quantitative evaluation processing is performed on the digital resource by the constructed resource quantitative evaluation model.

In this embodiment, model verification is performed on the constructed resource quantitative evaluation model based on the verification resource group and the model verification condition, and when the test fails, the resource quantitative evaluation model is reconstructed until the constructed resource quantitative evaluation model passes the model verification, which ensures that the constructed resource quantitative evaluation model can accurately perform quantitative evaluation on blockchain digital resources.

In an embodiment, the obtaining resource characteristic information of a historical digital resource having the class label includes: dividing the historical digital resource having the class label into an experimental resource group and a verification resource group, and obtaining resource characteristic information of the experimental resource group.

The experimental resource group is a digital resource obtained by dividing the historical digital resource having the class label, and is used to construct the resource quantitative evaluation model, and the verification resource group is a digital resource obtained by dividing the historical digital resource and is used to perform model verification on the constructed resource quantitative evaluation model. Specifically, the server determines the historical digital resource having the class label, and divides the historical digital resource into experimental resource groups and verification resource groups. The server obtains the resource characteristic information of the experimental resource groups, and constructs a resource quantitative evaluation model based on the resource characteristic information of the experimental resource groups.

Further, the fitting based on the resource characteristic information through multiple regression fitting methods, to obtain a quantitative attribute of the historical digital resource includes: fitting based on the resource characteristic information through multiple regression fitting methods, to obtain a quantitative attribute of the experimental resource group.

Specifically, the server fits based on resource characteristic information through multiple regression fitting methods, to obtain the quantitative attribute of the experimental resource group, and the quantitative attribute is a fitting attribute obtained by regression fitting of the experimental resource group through a corresponding regression fitting method.

Further, the obtaining fitting results of the multiple regression fitting methods based on a history exchange attribute of the historical digital resource and quantitative attributes obtained through fitting based on the multiple regression fitting methods includes: obtaining fitting results of the multiple regression fitting methods based on a history exchange attribute of the experimental resource group and quantitative attributes obtained through fitting based on the multiple regression fitting methods.

Specifically, the server obtains fitting results of the multiple regression fitting methods by comparing a history exchange attribute of the experimental resource group with quantitative attributes obtained through fitting based on the multiple regression fitting methods. The fitting results reflect the fitting degrees of the regression fitting methods.

In this embodiment, the historical digital resource having the class label is divided into experimental resource groups and verification resource groups, and the resource quantitative evaluation model is constructed through the experimental resource groups, so that the historical digital resource may be effectively used for model construction and model verification, ensuring that the constructed resource quantitative evaluation model can accurately perform quantitative evaluation on blockchain digital resources.

In an embodiment, the dividing the historical digital resource having the class label into an experimental resource group and a verification resource group includes: determining the historical digital resource having the class label; dividing the historical digital resource into an experimental resource group and a verification resource group; and in response to that an inter-group difference between the experimental resource group and the verification resource group does not satisfy an inter-group difference condition, returning to the step of dividing the historical digital resource into the experimental resource group and the verification resource group until the inter-group difference between the experimental resource group and the verification resource group satisfies the inter-group difference condition.

The experimental resource group is a digital resource obtained by dividing the historical digital resource having the class label, and is used to construct the resource quantitative evaluation model, and the verification resource group is a digital resource obtained by dividing the historical digital resource and is used to perform model verification on the constructed resource quantitative evaluation model. The inter-group difference is used to represent a data difference between digital resources in the experimental resource groups and digital resources in the verification resource groups. The inter-group difference may be calculated according to actual needs. For example, the inter-group difference may be determined according to a difference between average values, a difference between medians, a difference between variances, and a difference between standard deviations of the experimental resource group and the verification resource group. The inter-group difference condition is used to determine whether the historical digital resource needs to be regrouped to ensure that the data difference between the experimental resource group and the verification resource group meets requirements. The inter-group difference condition may include an inter-group difference threshold. When the inter-group difference between the experimental resource group and the verification resource group exceeds the inter-group difference threshold, it is considered that the grouping does not satisfy the inter-group difference condition, and the historical digital resource needs to be regrouped.

Specifically, the server determines the historical digital resource of the same class label as the target digital resource, and divides the historical digital resource into the experimental resource group and the verification resource group. Specifically, the historical digital resource may be randomly divided through the random grouping method to obtain the experimental resource group and the verification resource group. The server determines the inter-group difference between the experimental resource group and the verification resource group obtained through grouping. The server compares the obtained inter-group difference with the preset inter-group difference condition. If the inter-group difference between the experimental resource group and the verification resource group satisfies the inter-group difference condition, it indicates that the grouping of the experimental resource group and the verification resource group is appropriate, the resource quantitative evaluation model may be constructed based on the experimental resource group, and model verification may be performed on the constructed resource quantitative evaluation model based on the verification resource group. If the inter-group difference between the experimental resource group and the verification resource group does not satisfy the inter-group difference condition, it indicates that the current grouping is inappropriate, the server returns to the step of dividing the historical digital resource into the experimental resource group and the verification resource group, to regroup the historical digital resource, until the inter-group difference between the experimental resource group and the verification resource group obtained by grouping satisfies the inter-group difference condition.

In this embodiment, when the inter-group difference between the experimental resource group and the verification resource group does not satisfy the inter-group difference condition, the historical digital resource is regrouped until the inter-group difference between the experimental resource group and the verification resource group satisfies the inter-group difference condition, so as to ensure the independence between the experimental resource group and the verification resource group, which is conducive to ensuring that the constructed resource quantitative evaluation model can accurately perform quantitative evaluation on blockchain digital resources.

Figure 4:
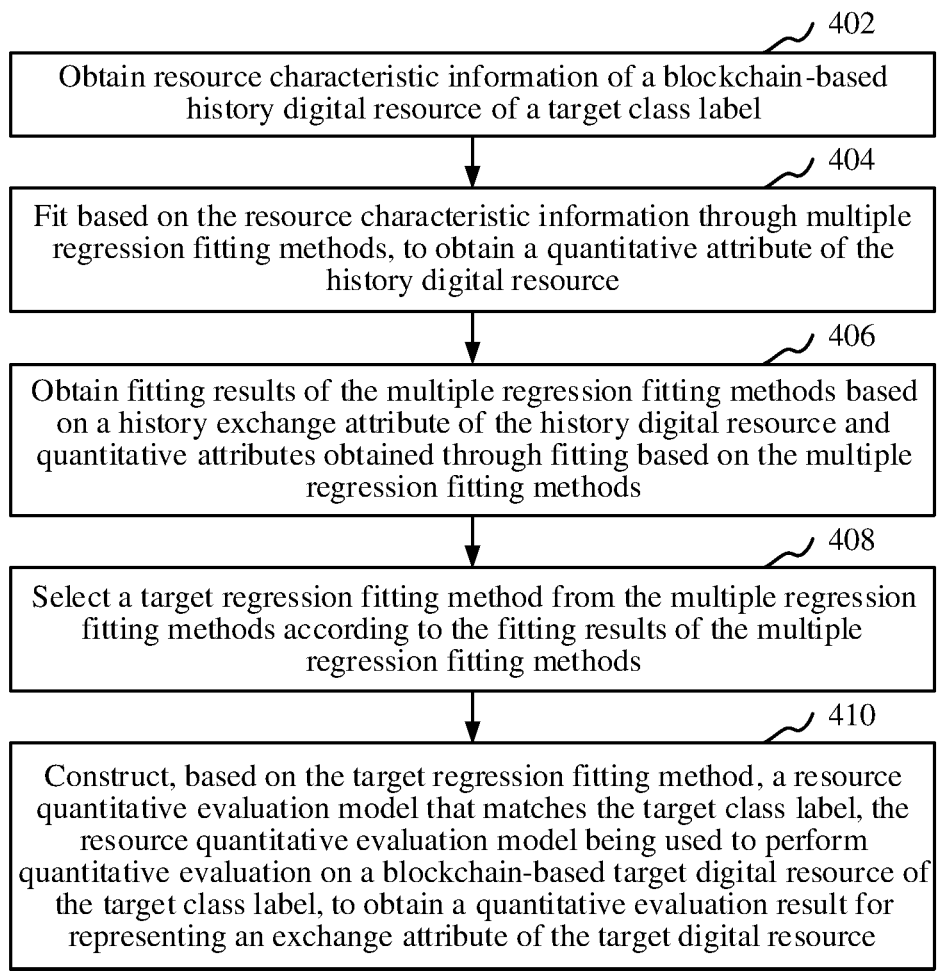
FIG. 4 is a schematic flowchart of a blockchain-based resource quantitative evaluation model processing method according to an embodiment.

In an embodiment, corresponding to the blockchain digital resource processing method, as shown in FIG. 4, a blockchain resource quantification evaluation model processing method is provided. The application of this method to the server in FIG. 1 is used as an example. The method includes the following steps:

Step 402: Obtain resource characteristic information of a blockchain-based historical digital resource of a target class label.

The target class label is a class label of the blockchain digital resource that requires construction of a resource quantitative evaluation model. The class label is used to represent a class of the digital resource, and the digital resource may have different representation forms, and thus correspond to different categories. Different categories of digital resources have different representations and resource characteristics, correspond to different class labels, and need to be subject to quantitative evaluation in different methods. Quantitative evaluation is evaluation processing of evaluating an attribute of digital resources and obtaining a quantitative result. For example, an exchange attribute of a digital resource may be evaluated. Specifically, quantitative evaluation may be performed on numbers of exchange times, exchange cycles, exchange values, exchange platforms, and the like of digital resources. Digital resources specifically may be digital assets in the blockchain, and digital assets are digital expression of assets in the blockchain, such as digital collections. The historical digital resource is of the target class label, and the historical digital resource is a digital resource that has a corresponding real result of quantitative evaluation. For example, when the quantitative evaluation of the digital resource aims at the exchange value, the historical digital resource may be a digital resource that has undergone at least one exchange and has a definite exchange price.

The resource characteristic information is information related to the characteristic of the historical digital resource, and may specifically include description information and transfer information of the historical digital resource. The description information is information describing the resource characteristic of the historical digital resource, and may specifically include creation information and attribute information of the historical digital resource. The creation information is information associated with the creation of the historical digital resource, such as a creation time, an on-chain time, and creator information of the historical digital resource, and the attribute information is information associated with the resource attribute of the historical digital resource, such as an attribute name, an attribute appearance probability, a resource expression form, and a resource subject included in the historical digital resource. The transfer information is information of the historical digital resource during the exchange process, such as an exchange time, an exchange price, information of two exchange parties, a number of exchange times, an exchange platform, blockchain information, and exchange background information of the historical digital resource. Since the blockchain-based digital resource is transparent and non-tamperable, the resource characteristic information of the historical digital resource may be obtained by tracing the resource transfer history record of the historical digital resource, that is, the exchange record of the historical digital resource.

Specifically, the server obtains the resource characteristic information of the blockchain-based historical digital resource of the target class label. Specifically, the server may determine the target class label that requires construction of a resource quantitative evaluation model, and obtain the blockchain-based historical digital resource of the target class label. The server traces the exchange record of the historical digital resource to obtain resource characteristic information of the historical digital resource.

Step 404: Fit based on the resource characteristic information through multiple regression fitting methods, to obtain a quantitative attribute of the historical digital resource.

Regression fitting refers to the fitting processing using regression algorithms, such as linear regression, logistic regression, polynomial regression, stepwise regression, lasso regression, hedonic regression and other regression algorithms. Fitting is a process of connecting data through a smooth curve. The connected curve may be expressed by a function, so that a model may be constructed based on the function. The regression fitting method is a fitting method for fitting the historical digital resource through a specific regression algorithm. The quantitative attribute is a quantitative attribute obtained by regression fitting of the historical digital resource. The quantitative attribute may be set according to actual quantitative evaluation needs, and may be specifically an exchange attribute of the historical digital resource, such as an exchange value, an exchange price, an exchange time, an exchange platform, or the number of exchange times.

Specifically, the server obtains quantitative attributes of historical digital resources through fitting based on resource characteristic information through multiple regression fitting methods, and the quantitative attributes are fitting attributes obtained by regression fitting of historical digital resources through corresponding regression fitting methods.

Step 406: Obtain fitting results of the multiple regression fitting methods based on a history exchange attribute of the historical digital resource and quantitative attributes obtained through fitting based on the multiple regression fitting methods.

A history exchange attribute is a real exchange attribute of the historical digital resource during the history exchange process. The fitting results are used to represent the fitting degrees of multiple regression fitting methods. Specifically, the server obtains fitting results of the multiple regression fitting methods by comparing a history exchange attribute of the historical digital resource with quantitative attributes obtained through fitting based on the multiple regression fitting methods. The fitting results reflect the fitting degrees of the regression fitting methods. The fitting result may specifically be the goodness of fit, and the statistic to measure the goodness of fit is a coefficient of determination $R^2$. The maximum value of $R^2$ is 1, and the closer the value of $R^2$ is to 1, the better the fitting degree. Conversely, the smaller the value of $R^2$, the worse the fitting degree.

Step 408: Select a target regression fitting method from the multiple regression fitting methods according to the fitting results of the multiple regression fitting methods.

The target regression fitting method is a regression fitting method selected from the multiple regression fitting methods according to the fitting results of the multiple regression fitting methods to construct the resource quantitative evaluation model. Specifically, the server screens the multiple regression fitting methods according to the fitting results of the multiple regression fitting methods, so as to select the target regression fitting method from the multiple regression fitting methods. In a specific implementation, the fitting result may include the goodness of fit $R^2$, and the server may determine the goodness of fit $R^2$ with the largest value from the goodness of fit $R^2$ corresponding to the multiple regression fitting methods, and determine a regression fitting method matching the goodness of fit $R^2$ with the largest value as the target regression fitting method, so that the target regression fitting method is selected from multiple regression fitting methods.

Step 410: Construct, based on the target regression fitting method, a resource quantitative evaluation model that matches the target class label. The resource quantitative evaluation model is used to quantitatively evaluate a blockchain-based target digital resource of the target class label, to obtain a quantitative evaluation result for representing an exchange attribute of the target digital resource.

The resource quantitative evaluation model is used to perform quantitative evaluation on a blockchain-based target digital resource of the target class label, to obtain a quantitative evaluation result for representing an exchange attribute of the target digital resource. The target digital resource is a blockchain-based digital resource that needs quantitative evaluation and processing. The exchange attribute is attribute information in resource exchange with the target digital resource, for example, may include an exchange value, an exchange price, a number of exchange times, and an exchange platform. The quantitative evaluation result is an evaluation result obtained from the quantitative evaluation of the target digital resource. The quantitative evaluation result may represent the exchange attribute of the target digital resource, for example, may represent the exchange value of the target digital resource. The resource quantitative evaluation model is constructed based on the target regression fitting method determined by screening. The resource quantitative evaluation model matches the target class label, and may perform accurate quantitative evaluation processing on the target digital resource of the target class label.

Specifically, after selecting the target regression fitting method, the server constructs, based on the target regression fitting method, a resource quantitative evaluation model that matches the target class label. Specifically, the server may construct an initial resource quantitative evaluation model through the target regression fitting method, train the initial resource quantitative evaluation model through the historical digital resource of the target class label, and after training, obtain a resource quantitative evaluation model that matches the target class label. The resource quantitative evaluation model may be used to perform quantitative evaluation on a blockchain-based target digital resource of the target class label, to obtain a quantitative evaluation result for representing an exchange attribute of the target digital resource.

In the blockchain-based resource quantitative evaluation model processing method, fitting is performed based on resource characteristic information of the blockchain-based historical digital resource of the target class label through multiple regression fitting methods, to obtain a quantitative attribute of the historical digital resource, a target regression fitting method is selected from the multiple regression fitting methods according to fitting results of the multiple regression fitting methods obtained based on the quantitative attribute and the history exchange attribute of the historical digital resource, and a model for quantitative evaluation of the blockchain-based target digital resource is constructed based on the target regression fitting method, to obtain a resource quantitative evaluation model for representing a quantitative evaluation result of the exchange attribute of the target digital resource. The blockchain-based historical digital resource of the target class label is fitted through multiple regression fitting methods, and the target regression fitting method for constructing a resource quantitative evaluation model is selected from the multiple regression fitting methods according to the fitting results. In this way, the constructed resource quantitative evaluation model may perform quantitative evaluation on the target digital resource based on the exchange attribute of the historical digital resource of the same class label, thereby improving the accuracy of quantitative evaluation of blockchain digital resources.

In an embodiment, the fitting based on the resource characteristic information through multiple regression fitting methods, to obtain a quantitative attribute of the historical digital resource includes: performing quantitative processing on resource characteristic information to obtain resource characteristic factors; testing the resource characteristic factors and obtaining a target characteristic factor from the resource characteristic factors based on a test result; and fitting based on the target characteristic factor through multiple regression fitting methods, to obtain a quantitative attribute of the historical digital resource.

The resource characteristic factor is a characteristic factor obtained by quantifying the resource characteristic information. A data format of the resource characteristic factor matches a corresponding type of resource characteristic information. By performing quantitative processing on the resource characteristic information, a format of the same type of resource characteristic information may be unified, which helps to ensure the accurate expression of resource characteristics. The target characteristic factor is a characteristic factor used for regression fitting processing and selected from resource characteristic factors through testing.

Specifically, the server performs quantitative processing on resource characteristic information, and different quantitative processing may be performed on different types of resource characteristic information to obtain resource characteristic factors. For example, for resource characteristic information with data continuity, the server performs continuous quantification on this type of resource characteristic information, so as to quantify this type of resource characteristic information into a continuous resource characteristic factor. For resource characteristic information without data continuity, the server performs discontinuous quantification on this type of resource characteristic information to quantify this type of resource characteristic information into a discontinuous resource characteristic factor. The server obtains the resource characteristic factor based on the continuous resource feature factor and the discontinuous resource characteristic factor. The server tests the obtained resource characteristic factor to ensure the validity of the resource characteristic factor, which may be used for accurate quantitative evaluation of digital resources. The server may specifically analyze the validity of each resource characteristic factor to test the resource characteristic factor, and the server may screen the resource characteristic factors according to test results of the resource characteristic factors to obtain the target characteristic factor that may be used for accurate quantitative evaluation of digital resources. The target characteristic factor can affect quantitative evaluation results of digital resources, and therefore it is necessary to introduce the target characteristic factor to ensure the accuracy of quantitative evaluation of digital resources. The server fits based on the target characteristic factor through multiple regression fitting methods, to obtain a quantitative attribute of the historical digital resource. For example, the server may use multiple regression fitting methods and respectively use the target characteristic factor as an independent variable of the fitting and use the quantitative attribute of the historical digital resource as a dependent variable of the fitting, so as to obtain the quantitative attribute of the historical digital resource through fitting based on the target characteristic factor.

In this embodiment, by performing quantitative processing on the resource characteristic information, a format of the same type of resource characteristic information is unified, which helps to ensure the accurate expression of resource characteristics. Further, the target characteristic factor may be selected through the testing of the resource characteristic factor and the quantitative attribute of the historical digital resource may be obtained by fitting through multiple regression fitting methods, which can ensure the validity of the target characteristic factor in the fitting process, thereby ensuring that the constructed resource quantitative evaluation model can accurately perform quantitative evaluation on blockchain digital resources.

The present disclosure further provides an application scenario, which applies the above-mentioned blockchain digital resource processing method. Specifically, the application of the blockchain digital resource processing method in the present disclosure scenario is as follows:

This embodiment relates to a blockchain, and the blockchain includes a public chain, a private chain, and a consortium chain. The public chain is a public blockchain and is a blockchain that anyone can enter and exit freely, and completely conforms to decentralization, and bookkeepers are all participants. The private chain is a completely closed blockchain controlled by a centralized organization. For a blockchain that does not have the decentralized blockchain nature, participants are only owners of the blockchain. A consortium chain is a blockchain used internally by a specific group or organization, participants are members of the consortium. The generation of each blockchain is jointly determined by pre-selected bookkeepers. Other nodes may only trade and have no bookkeeping rights. In this embodiment, the blockchain-based digital resource may be non-fungible token (NFT) digital collections. The NFT is the only encrypted currency token used to represent digital collections and may be traded.

With the leapfrog development of the NFT market, more and more investors begin to turn attention to the NFT market and regard the NFT market as an alternative investment method. However, the NFT market is still in the early stage of development. The imperfect market governance mechanism and the lack of effective price reflection restrict the further development of the market and lead to losses for investors. Based on this, a blockchain digital resource processing method provided in this embodiment may implement the evaluation of NFT digital collections, and may accurately value NFT digital collections from the perspective of alternative investment. Specifically, hedonic regression is combined with the unique factors of NFT digital collections, a large amount of transparent, open, and non-tamperable transaction data generated by NFT transactions on the blockchain is used for fitting, and an evaluation model for different types of NFT digital collections is constructed and is used for evaluation analysis of NFT digital collections.

The blockchain digital resource processing method provided in this embodiment may provide scientific and reasonable pricing reference and evaluation methods for digital collection investors, digital artwork creators, NFT transaction platforms or auction parties. In addition, the blockchain digital resource processing method in this embodiment may also be used as core modules of intelligent investment advisors, NFT digital intelligent marketing tools, and NFT creator auxiliary creation tools, thereby providing reference opinions and decision-making support for relevant stakeholders. Since the NFT digital collection market is emerging, the blockchain digital resource processing method provided by this embodiment has great innovative significance and market value. Considering the scale and anti-inflation effect of the NFT artwork market, it is expected that the blockchain digital resource processing method provided by this embodiment will have a huge economic effect and role in financial investment institutions, artwork institutions, and technology circles.

The current NFT digital collection market is hot, and there are countless new types of NFT digital collections launched every day. Investors lack a scientific and reasonable price reference when facing various choices, which may easily lead to investment failure and unnecessary losses. From the perspective of regulating the NFT digital collection market, the lack of an effective price reference or pricing framework also damages the development of the market in the long run. The current evaluation of artworks mainly relies on the manual determination and evaluation of galleries, auction houses or professional technicians, and mainly makes determination from the dimensions of the authenticity, ages, genres, and authors of artworks. This evaluation method has strong subjectivity and relies on the experience of the pricing staff. For investors of NFT digital collections, this evaluation method is opaque and non-transferable, and greatly affects pricing efficiency. For the quantitative evaluation of NFT digital collections, related technologies mainly construct evaluation models based on the evaluation of traditional artworks such as physical paintings. Due to physical attributes of traditional artworks, it is difficult to quantify and measure relevant attributes of the works. Therefore, the existing evaluation model is excessively simple and general in the selection of factors and mainly measures the price by looking for existing traded works that are highly similar to the works to be evaluated. The essence is a process of looking for a reference system, and this process has two flaws: the similarity recognition error and the inability to find the reference system.

However, the blockchain digital resource processing method provided in this embodiment adopts the hedonic regression (hedonic regression or characteristic price regression) method to scientifically measure the attributes of the NFT digital collections, investment attributes as artworks, and the impact of consumer utility on prices, to construct a regression evaluation model covering all types of NFT digital collections. Since NFT digital collections are traded on the blockchain, transaction parties and transaction data are recorded and cannot be tampered with. Therefore, when constructing an evaluation model, a large amount of data support may be obtained, and an evaluation model that is more accurate than the traditional artwork evaluation model may be constructed. This embodiment prospectively values NFT digital collections as an independent object, and innovatively provides a scientific method for estimating the fair value.

Figure 5:
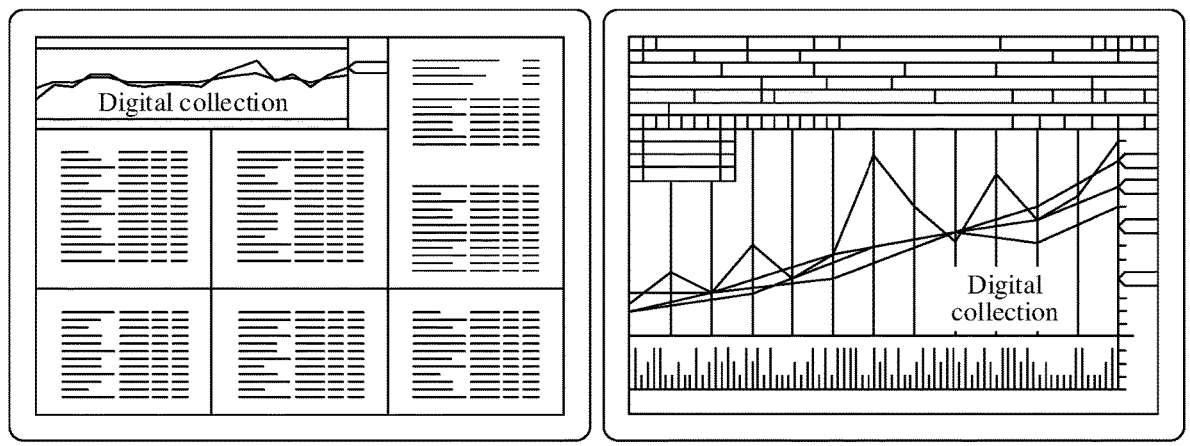
FIG. 5 is a schematic diagram of a time sequence graph of evaluation of an NFT digital collection according to an embodiment.

For investors of NFT digital collections, the blockchain digital resource processing method provided in this embodiment may be used to evaluate the market value of NFT digital collections, and then make investment decisions. Specifically, when determining NFT digital collections to be bought, digital collection investors may use the blockchain digital resource processing method provided in this embodiment to evaluate the value of the NFT digital collections, to determine whether the NFT digital collections are overvalued or undervalued, so that evaluation results and time sequence graphs of evaluation of different types of NFT digital collections may be shown to investors. As shown in FIG. 5, investors of NFT digital collections may view the prices and evaluation changes over time of various NFT digital collections on the terminal.

Figure 6:
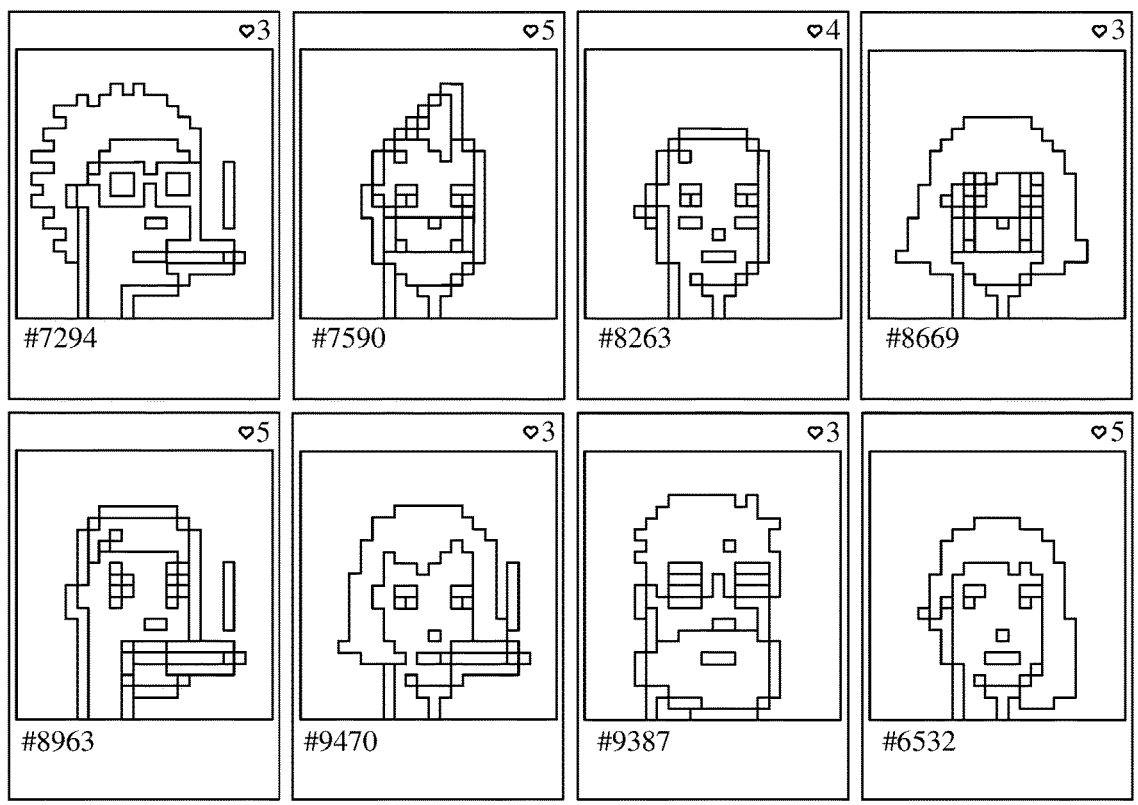
FIG. 6 is a schematic diagram of an NFT digital collection according to an embodiment.

For exchanges and auction houses, the blockchain digital resource processing method provided in this embodiment may be used to calculate the price of NFT digital collections in the primary market, thereby assisting in pricing. Specifically, the blockchain digital resource processing method provided in this embodiment may be used as the automatic calculation background of primary market pricing modules of NFT digital collections. When NFT digital collections are minted on the blockchain and need to be traded with the help of an NFT digital collection exchange, the digital collections need to be priced for the first time. The blockchain digital resource processing method provided in this embodiment may be provided by exchanges to authors, and estimate a relatively fair market price based on various characteristics of the work to promote the sale of the work. As shown in FIG. 6, 8 NFT digital collections need to be traded and auctioned. Each NFT digital collection has a different number, and is a non-fungible token.

For creators of NFT digital collections, the blockchain digital resource processing method provided by this embodiment may be used to conduct market trend research and determination, so as to create more NFT artworks that consumers and investors like, and may also assist in commercializing works to create more market values. For example, there are currently 5 major categories of NFT digital collections: collections, metaverse, artworks, DeFi (distributed finance), and utility (utility tokens). Creators of NFT digital collections may analyze to discover factors that have the greatest impact on transaction values of NFT digital collections in creation of the 5 categories of NFT digital collections by using the blockchain digital resource processing method in this embodiment, so as to create NFT digital collections that are more popular in the market. Specific product representation may be creating intelligent auxiliary software.

Figure 7:
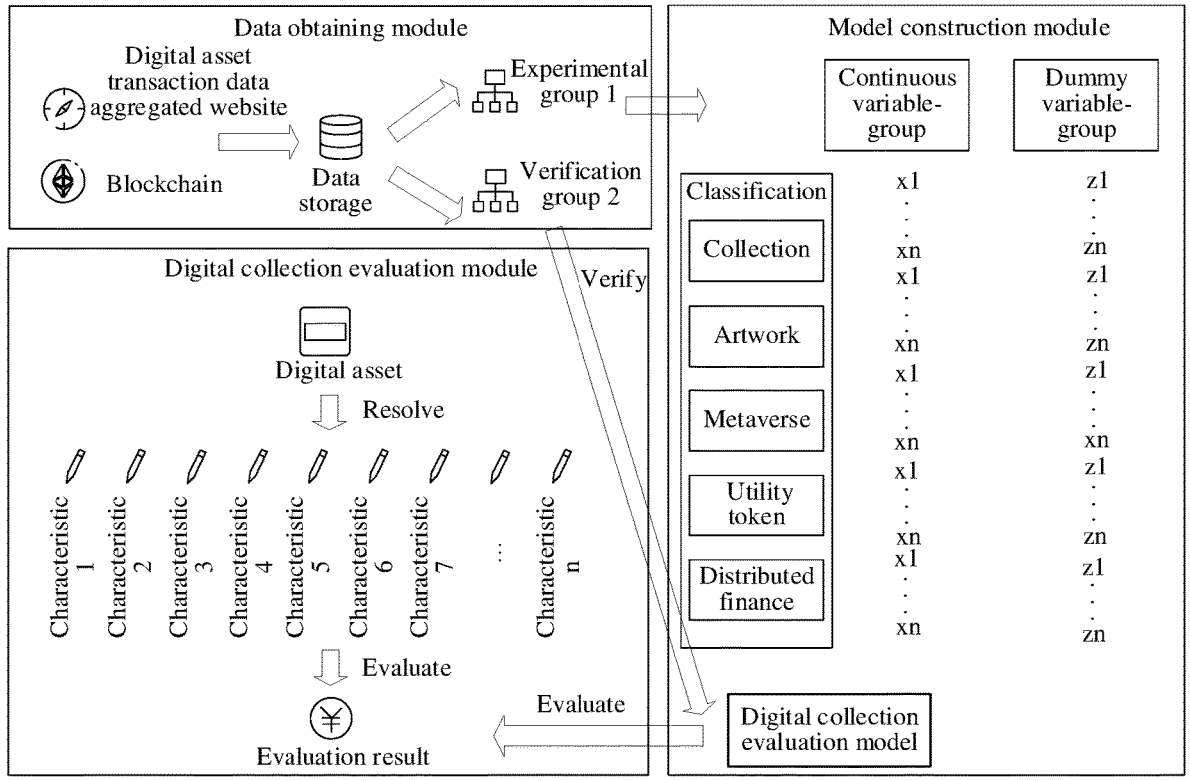
FIG. 7 is a schematic diagram of a system architecture of a blockchain digital resource processing method according to an embodiment.

Specifically, a system architecture of the blockchain digital resource processing method provided by this embodiment, as shown in FIG. 7, includes a total of three modules: a data obtaining module, a model construction module, and a digital collection evaluation module, which respectively perform a data obtaining step, a model construction step, and a digital collection evaluation step. Specifically, the data obtaining module obtains characteristic data of NFT digital collections from a blockchain and a digital asset transaction data aggregated website, and stores the characteristic data in a data storage. The characteristic data of the NFT digital collections is divided into an experimental group 1 and a verification group 2. The model construction module constructs a digital collection evaluation model based on characteristic data of the experimental group 1, and specifically divides the characteristic data into continuous variables and dummy variables for various types of digital collections, and constructs a digital collection evaluation model based on the continuous variables and the dummy variables. Verification is performed on the constructed digital collection evaluation model based on characteristic data of the verification group 2, and after the verification succeeds, the digital collection evaluation model is used to perform evaluation processing on a digital collection. The digital collection evaluation module may obtain a digital collection that needs to be valued. After obtaining a characteristic factor through resolving, the digital collection evaluation model may value the digital collection to obtain an evaluation result of the digital collection.

When performing the data obtaining step, the data obtaining module may specifically obtain market transaction data of NFT digital collections. Due to the transparency and non-tamperability of blockchain transaction records, transaction records of NFT digital collections on the blockchain may be obtained through a technology of traversing the NFT digital collection transaction data aggregated website or the blockchain. Specific obtained data fields are shown in Table 1.

TABLE 1

| First-level class | Second-level class | Third-level class | Definition |
|---|---|---|---|
| Micro factors | NFT basic information | Collection name | Name of an NFT digital collection |
|  |  | Mint time | On-chain mint time of an NFT digital collection |
|  | NFT transaction information | Transaction time | Time of ownership transfer of an NFT digital collection on the blockchain, where the format is "year-month-day hour:minute:second" |
|  |  | Transaction price | Price of ownership transfer of an NFT digital collection on the blockchain, where a price denominated in a legal currency and a price denominated in a digital currency are respectively obtained |

TABLE 1-continued

| First-level class | Second-level class | Third-level class | Definition |
|---|---|---|---|
| | | Seller wallet address | Seller e-wallet address of an NFT digital collection |
| | | Buyer wallet address | Buyer e-wallet address of an NFT digital collection |
| | | Number of transactions | Number of transactions of an NFT digital collection |
| | NFT attribute information | NFT attribute name | Attribute characteristic name of an NFT digital collection |
| | | NFT attribute appearance probability | Number of times an attribute characteristic of an NFT digital collection appear in this series of works |
| | | NFT representation form | Representation form of an NFT digital collection (painting, collection, music, sport, photography, tradable card, Metaverse, and utility) |
| | | NFT subject | NFT representation subject (portrait, landscape, architecture, religion, science, and the like) |
| | NFT sales characteristic | Transaction platform | Transaction platform name of an NFT digital collection |
| | | Transaction platform popularity | Is a transaction platform of an NFT digital collection popular? |
| | | Blockchain | Blockchain for minting an NFT digital collection |
| | | Denominating currency | Digital currency used to denominate an NFT digital collection |
| | | Token standard (TS) | Token standard used for an NFT digital collection |
| | Artist characteristic | NFT creator | Creator of an NFT digital collection |
| | | Number of works of an NFT creator | Number of works created by an NFT digital collection creator |
| | | Number of owners of works of an NFT creator | Number of sellers of works of an NFT digital collection creator |
| | | Number of transactions of an NFT work | Total number of transactions of works of an NFT digital collection creator |
| | | Base price of an NFT work | NFT digital collection creator |
| | | Author certification | Certification status of an NFT digital collection creator |
| | | Number of followers in a social application of an author | Number of followers in a social application of an NFT digital collection creator |
| Macro factors | Market index of an NFT digital collection | Yield of an NFT digital collection | Yield of an NFT digital collection within a statistical time period |
| | Market index of other comparable investment products | Treasury bond yield | Treasury bond yield within a statistical time period |
| | | 10-year bond yield in a designated area | 10-year bond yield in a designated area within a statistical time period |
| | | World stock yield | World stock yield within a statistical time period |
| | | Stock yield in a designated area | Stock yield in a designated area within a statistical time period |
| | | Yield of a digital currency | Yield of a digital currency within a statistical time period |
| | | Ethereum price yield | Ethereum price yield within a statistical time period |
| | | Gold yield | Gold yield within a statistical time period |
| | | Real estate REIT yield in a designated area | Real estate investment trust (REIT) yield in a designated area within a statistical time period |
| | | Traditional artwork yield | Traditional artwork yield within a statistical time period |

Figure 8:
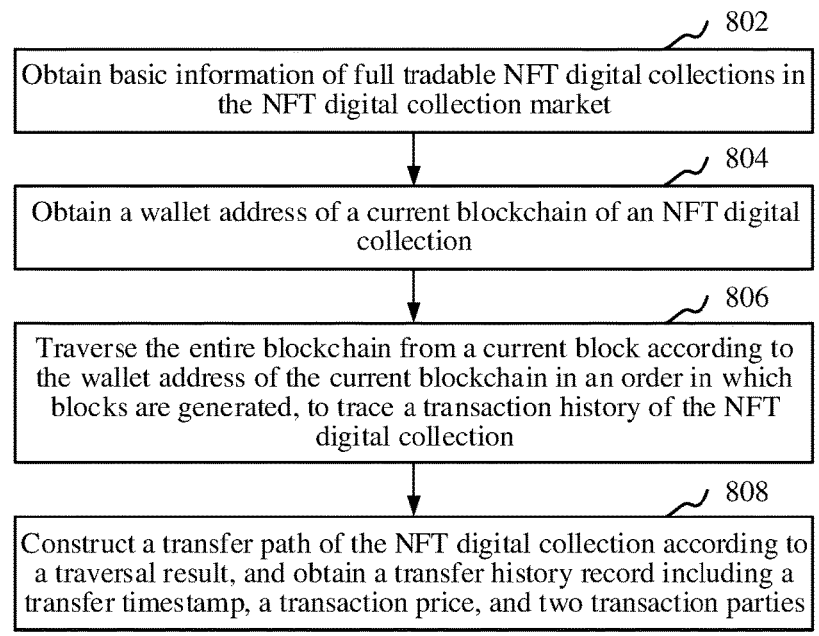
FIG. 8 is a schematic flowchart of obtaining a transfer history record of an NFT digital collection according to an embodiment.

Basic information, attribute information, and some sales characteristics and artist characteristics of NFT digital collections may be collected from NFT transaction data aggregated websites or transaction websites, so as to obtain basic information of full tradable NFT digital collections in the NFT digital collection market. After information about the full NFT digital collections and e-wallet addresses currently storing the collections are obtained, full transaction information of the NFT digital collections on the blockchain may be obtained by backtracing the blockchain. Specific processing is shown in FIG. 8. Step 802: A server obtains basic information of full tradable NFT digital collections in the NFT digital collection market. Specific basic information may be shown in Table 1. Step 804: Obtain a wallet address of a current blockchain of an NFT digital collection. Step 806: Traverse the entire blockchain from a current block according to the wallet address of the current blockchain in an order in which blocks are generated, to trace a transaction history of the NFT digital collection. Specifically, the server may determine the current block according to the wallet address of the current blockchain, and traverse the entire blockchain in an order in which the current block is generated, to trace the transaction history of the NFT digital collection. Step 808: Construct a transfer path of the NFT digital collection according to a traversal result, and obtain a transfer history record including a transfer timestamp, a transaction price, and two transaction parties. The transfer history record may include various transfer information of the NFT digital collection in history transaction, which is specifically the transaction information in Table 1.

Figure 9:
FIG. 9 is a schematic diagram of an NFT digital collection of Bored Ape series according to an embodiment.

Further, the data obtained by the data obtaining module further includes some processed data indicators, which may specifically include an NFT attribute appearance probability, transaction platform popularity, and the like. For the NFT attribute appearance probability, an NFT attribute refers to a series of characteristics that are randomly assigned by creators manually or algorithms automatically according to established rules and probabilities during the creation process of NFT digital collections. NFT digital collections with attributes that appear at a lower probability are rarer. For example, in the Bored Ape (BA) project, as shown in FIG. 9, an attribute of a work Bored Ape Yacht Club numbered #2742 is: Eyes (Scumbag), mouth (Bored Cigarette), hat (Short Mohawk), clothes (Leather Punk Jacket), fur (Trippy), and background (Blue). A calculation formula for the NFT attribute appearance probability is as follows:

$$P(A) = \frac{N_t}{\sum_{i=1}^{n} N_i}$$

P(A) is an NFT attribute appearance probability, $N_t$ is a number of digital collections that are with a $t^{th}$ NFT attribute and that are of a class of NFT digital collections, n is a number of NFT attributes of a class of NFT digital collections, and $N_i$ is a number of digital collections that are with an $i^{th}$ NFT attribute and that are of a class of NFT digital collections. The above formula indicates a ratio of a number of works in which an attribute of a specific class of NFT digital collection appears to a total number of works of this class of NFT digital collection. For example, in the above example, Scumbag appears in a total of 10 NFT digital collections of Bored Ape series, and Bored Ape includes a total of 100 digital collections. In this case, a Scumbag appearance probability is 10/100=10%.

Regarding the transaction platform popularity, NFT digital collections mainly rely on digital asset exchanges for transactions. Compared with unpopular platforms, popular transaction platforms gather more buyers and sellers, and it is easier to match transactions. Therefore, it is necessary to quantify the transaction platform popularity. The transaction platform popularity may be calculated based on a transaction share in the NFT digital asset market. If a transaction platform of NFT digital collections belongs to the top ten exchanges or popular auction houses, a value is 1; otherwise, the value is 0.

In addition, in Table 1, token standard is the underlying protocol of NFT, and is divided into ERC-721, ERC-1155, and ERC-998 according to launch times. ERC-721 is an NFT underlying protocol, and each token is different internally. ERC-1155 is an NFT protocol with FT characteristics. Each class of an ERC-1155 token is different, but the same class has the attribute of fungible token (FT) and may implement complete exchange. ERC-998 is a standardized extension that allows each NFT to be formed by other NFTs or FTs. Macro factors are alternative factors that may affect investor purchase of NFT digital assets. Yield data of NFT digital collections and investment yields of corresponding investment targets of traditional investment targets within a given time period may be collected through NFT digital collection transaction data aggregated websites and financial terminals respectively, that is, transaction background information of NFT digital collections may also be introduced to value NFT digital collections.

Further, after data necessary to construct an NFT digital collection evaluation model is collected, it is necessary to classify and group characteristic data according to categories of NFT digital collections. Specifically, according to the categories of NFT digital collections, the full market data is classified according to product categories and put into storage respectively. The reason is that different products have different product performances and characteristics, and have different performances in evaluation models and factor coefficients. Categories of NFT digital collections may include: painting, collection, music, sport, photography, tradable card, Metaverse, and utility. After NFT digital collections are classified, characteristic data of NFT digital collections in each class may be grouped by using a complete randomization (CR) method, to confirm an experimental group and a verification group of the evaluation model. An execution method may be specifically as follows: first, IDs are randomly generated for NFT digital collections in each class, then hash is performed on the product IDs and then a modulo operation is performed on a hash result by 100 to obtain a remainder value, and then digital collections with the same result values are divided into an experimental group and a verification group. It is verified whether an inter-group difference between the experimental group and the verification group is less than a preset threshold. Descriptive statistical analysis is performed on the experimental group and the verification group respectively, to analyze data such as means, medians, variances, and standard deviations of the characteristic data of the experimental group and the verification group respectively, and the data is compared with preset thresholds a1, a2, . . . , and an. Grouping is completed until the results of the descriptive statistical analysis are less than the preset thresholds; otherwise, a CR method is used for regrouping.

Further, before a price of an NFT digital collection is estimated by using the hedonic regression model, it is necessary to quantify collected product data for model construction. Specifically, collected NFT digital collection data may be converted into two types of variables: continuous variables and dummy variables. The dummy variable (DV) is an artificial variable used to reflect a qualitative attribute, is a quantified independent variable, and usually is a value of 0 or 1. A specific quantification result is shown in the following Table 2.

TABLE 2

| Variable type | Variable name | | Variable content | Variable quantification result |
|---|---|---|---|---|
| Independent variable | Transaction characteristic | Mint time | On-chain mint time of an NFT digital collection | Continuous variable |
| | | First transaction time | First transaction time of an NFT digital collection | Continuous variable |
| | | First transaction price | First transaction price of an NFT digital collection | Continuous variable |
| | | Latest transaction time | Time when an NFT digital collection was last traded | Continuous variable |
| | | Latest transaction price | Price when an NFT digital collection was last traded | Continuous variable |
| | | Number of transactions | Number of times an NFT digital collection is transferred between different wallet addresses | Continuous variable |
| | NFT attribute characteristic | Number of NFT attributes | Number of NFT digital collection attributes | Continuous variable |
| | | NFT attribute number rarity | Rarity of a number of NFT digital collection attributes in the current series of collections | Continuous variable |
| | | NFT attribute probability rarity | Rarity of an NFT digital collection attribute | Continuous variable |
| | | NFT subject | A portrait value is 1 and other values are 0<br>A landscape value is 1 and other values are 0<br>An architecture value is 1 and other values are 0<br>A religion value is 1 and other values are 0<br>A science value is 1 and other values are 0<br>A comic value is 1 and other values are 0<br>A 3D value is 1 and other values are 0<br>An abstract value is 1 and other values are 0 | Dummy variable |
| | Exchange medium characteristic | Transaction platform | An opensea value is 1 and other values are 0<br>An axie infinity value is 1 and other values are 0<br>A cryptopunks value is 1 and other values are 0<br>. . . | Dummy variable |
| | | Transaction platform popularity | A popular platform value is 1 and other values are 0 | Dummy variable |
| | | Blockchain | An Ethereum value is 1 and other values are 0<br>A polygon value is 1 and other values are 0<br>A Klayth value is 1 and other values are 0<br>. . . | Dummy variable |
| | | Token standard | An ERC-721 value is 1 and other values are 0<br>An ERC-1155 value is 1 and other values are 0<br>An ERC-998 value is 1 and other values are 0 | Dummy variable |
| | | Denominating currency | An Ethereum (ETH) value is 1 and other values are 0<br>A wrapped Ethereum (WETH) value is 1 and other values are 0<br>A DAI (stablecoin) value is 1 and other values are 0<br>A binance coin (BNB) value is 1 and other values are 0<br>A USDC (encrypted stablecoin) value is 1 and other values are 0<br>A WHALE (whale coin) value is 1 and other values are 0 | Dummy variable |

TABLE 2-continued

| Variable type | Variable name | Variable content | Variable quantification result |
|---|---|---|---|
| | | A legal currency value is 1 and other values are 0 . . . | |
| Creator characteristic | Number of works of an NFT creator | Total number of works created by an NFT digital collection creator | Continuous variable |
| | Number of owners of works of an NFT creator | Number of owners of all works created by an NFT digital collection creator | Continuous variable |
| | Number of transactions of an NFT work | Total number of transactions of works of an NFT digital collection creator | Continuous variable |
| | Base price of an NFT work | Transaction base price of all works of an NFT digital collection creator | Continuous variable |
| | NFT author certification | if an NFT digital collection creator has been certified, a value is 1; otherwise, the value is 0 | Dummy variable |
| | Number of followers in a social application of an NFT author | Number of followers of a social application account of an NFT digital collection creator | Continuous variable |
| Alternative investment variable | Yield of an NFT digital collection | Yield of an NFT digital collection within a statistical time period | Continuous variable |
| | Treasury bond yield | Treasury bond yield within a statistical time period | Continuous variable |
| | 10-year bond yield in a designated area | 10-year bond yield in a designated area within a statistical time period | Continuous variable |
| | World stock yield | World stock yield within a statistical time period | Continuous variable |
| | Stock yield in a designated area | Stock yield in a designated area within a statistical time period | Continuous variable |
| | Yield of a digital currency | Yield of a digital currency within a statistical time period | Continuous variable |
| | Ethereum price yield | Ethereum price yield within a statistical time period | Continuous variable |
| | Gold yield | Gold yield within a statistical time period | Continuous variable |
| | Real estate REIT yield in a designated area | Real estate REIT yield in a designated area within a statistical time period | Continuous variable |
| | Traditional artwork yield | Traditional artwork yield within a statistical time period | Continuous variable |
| Dependent variable | Current price of an NFT digital collection | | Continuous variable |

The NFT attribute number rarity may be obtained based on a formula $$P(N) = \frac{N_i}{\sum_t^n N_i}.$$

$N_i$ is a number of NFT attributes, $\sum_t^n N_i$ is a sum of numbers of attributes of all digital collections of the same class, n is a number of all digital collections of the same class, and t is a serial number of a current digital collection. The NFT attribute probability rarity may be calculated based on a formula $$P(r) = \prod_i^n p_i.$$

$p_i$ attribute probability of an $i^{th}$ attribute, and n is a number of attributes.

Further, since there are a total of 8 categories of NFT digital collections, in order to determine whether the independent variable factors have significant characteristics in evaluation of different categories of NFT digital collections, one-way analysis of variance (one-way analysis of variance) needs to be performed on the 31 independent variable factors in Table 2. Values F and values P after verification analysis of the 31 independent variable factors may be compared with preset target values F and preset target values P. When F>=target value F and P<=target value P, this independent variable is included in an evaluation model of this class of NFT digital collections when constructing the evaluation model.

Due to the difference between mathematical significance and economic significance of the model, a model form that can best fit the asset price of NFT digital collections needs to be selected. The hedonic regression algorithm has developed into rich mathematical expression forms. Statistically, R2 is used to measure the goodness of fit of the model. The larger R2 statistic indicates the better goodness of fit. Hedonic regression is a method that uses a regression model to estimate the impact of different characteristics on the price of a commodity. In this model, the independent variable is a factor that affects the utility of a commodity user, and the dependent variable is the price of a commodity. Therefore, 4 types of hedonic regression models are used for price fitting on data of the experimental group that has been grouped, and the most suitable model form is selected as an evaluation model form of the $i^{th}$ class of NFT digital assets according to fitting results.

A linear equation form is $P_t=\beta_0+\Sigma_{j=1}^{m}\beta_j Z_{tj}+\varepsilon_t$. $P_t$ is an estimated price of a digital collection with a serial number t, $\beta_j$ is a characteristic coefficient corresponding to a characteristic variable $Z_{tj}$ of an NFT digital collection, and means that when the other variables remain unchanged, each unit change in the characteristic of an NFT digital collection causes a change in the price of the NFT digital collection, $\varepsilon_t$ is function residual and is independent of the other characteristic variables and the mean is equal to 0, $\beta_0$ is a constant item, and m is a number of characteristic traversals. A double-logarithmic linear equation form is $\ln P_t=\beta_0+\Sigma_{j=1}^{m}\ln\beta_j Z_{tj}+\varepsilon_t$. $P_t$ is an estimated price of a digital collection with a serial number t, $\beta_j$ is a characteristic coefficient corresponding to a characteristic variable $Z_{tj}$ of an NFT digital collection, and means that when the other variables remain unchanged, each unit change in the characteristic of an NFT digital collection causes a change in the price of the NFT digital collection, $\varepsilon_t$ is function residual and is independent of the other characteristic variables and the mean is equal to 0, $\beta_0$ is a constant item, and m is a number of characteristic traversals. The double-logarithmic linear equation can effectively reflect the law of diminishing marginal effect between commodity characteristics and commodity prices, but still has limitations when dealing with dummy variables. A semi-logarithmic linear equation form is $\ln P_t=\beta_0+\Sigma_{j=1}^{m}\beta_j Z_{tj}$, $P_t$ is an estimated price of a digital collection with a serial number t, $\beta_0$ is a characteristic coefficient corresponding to a characteristic variable $Z_{tj}$ of an NFT digital collection, and $\beta_0$ is a constant item. The economic significance of the semi-logarithmic linear equation is that when other variables remain unchanged, the characteristic coefficient represents a percentage change in the price of an NFT digital collection brought about by each unit change of the variable.

Further, a Box-Cox conversion form is:
when y>0, $$y^{(\lambda)} = \begin{cases} \frac{y^\lambda - 1}{\lambda}, & \lambda \neq 0 \\ \log y, & \lambda = 0 \end{cases}$$

when y<=0, $$y^{(\lambda)} = \begin{cases} \frac{(y+\delta)^\lambda - 1}{\lambda}, & \lambda \neq 0 \\ \log (y+\delta), & \lambda = 0 \end{cases}$$

y is an estimated price of a digital collection, $y^{(\lambda)}$ is a conversion amount of the estimated price of the digital collection, $\lambda$ is a conversion parameter to be determined, and $\delta$ is a constant.

Further, the optimal function form may be obtained by the maximum likelihood iterative method:

$$L_{max} = (\theta - 1)\sum \log P - \frac{n}{2} \log (2\pi) -$$
$$\frac{n}{2} \log (\delta^2) - \frac{1}{2\delta^2}\sum\left[\frac{P^\theta - 1}{\theta} - \alpha - \beta\frac{Z^\lambda - 1}{\lambda}\right]$$

$\lambda$ and $\theta$ are optimal parameter values for calculating a hedonic function, Lmax is a maximum likelihood function of a maximum likelihood iterative method, $\alpha$, $\beta$, and $\delta$ are constant coefficients, Z is a characteristic variable, P is an estimated price of a digital collection, and n is a number of all digital collections of the same class.

The quadratic box-cox transformation is a more flexible model, and a function expression form is:

$$P^{(\theta)} = \alpha + \sum_{i=1}^{t}\beta_i Z_i^{(\lambda)} + \frac{1}{2}\sum_{i=1}^{t}\sum_{r=1}^{t}\gamma_{ir} Z_r^\lambda + \varepsilon$$

$P^{(\theta)}$ is an estimated value of a digital collection, $\alpha$ is a constant item, $\beta_i$ is a characteristic coefficient corresponding to an i th characteristic variable $Z_i^{(\lambda)}$ of an NFT digital collection, $\varepsilon$ is function residual, $\gamma_{ir}$ is a training coefficient of an $r^{th}$ characteristic variable $Z_r^\lambda$ of an NFT digital collection, t is a number of characteristic variables, and $\lambda$ is a transformation parameter to be determined in the quadratic box-cox transformation.

Further, fitting is performed based on the above four hedonic regression models by using relevant data of the experimental group, R2, adjusted-R2, and value F of each form are outputted, and a function form with Max(adjusted-R2) is selected as a basic form for construction of an evaluation model of such NFT digital assets. A hedonic regression evaluation model for an NFT digital collection in a specified form whose dependent variable is a current price P of the NFT digital collection and whose independent variable is a selected factor is constructed by using the data of the experimental group. Since the NFT digital collections have been divided into 8 categories, 8 evaluation models for NFT digital collections are eventually outputted.

After the model is constructed, the technical validity and prediction accuracy of the model are tested. Specifically, technical validity test includes multicollinearity test, residual normality test, and random errorterm autocorrelation test.

Multicollinearity test is performed based on two indicators: variance inflation factor (VIF) or tolerance (TOL), where the tolerance TOL is the reciprocal of the variance inflation factor. A specific calculation formula is as follows:

$$VIF_k = \frac{\text{Variance of the } k^{th} \text{ coefficient}}{\text{Variance of the } k^{th} \text{ coefficient when the independent variable is uncorrelated}} = \frac{1}{1 - R_k^2} = \frac{1}{TOL_k}$$

$VIF_k$ is a variance inflation factor of a $k^{th}$ coefficient, $R_k$ is a negative correlation coefficient of regressive analysis of an independent variable on the other independent variables, and $TOL_k$ is tolerance of the $k^{th}$ coefficient. When VIF<10 or TOL>0.1, it proves that there is no multicollinearity in the model. If VIF>=10 or TOL<=0.1, a problem factor is removed and the model is reconstructed.

In the residual normality test, it is determined whether the residuals of the model approximately belong to normal distribution, and if the residuals of the model do not approximately belong to normal distribution, model construction fails.

The random errorterm autocorrelation test is performed through the D-W test, and a calculation formula is:

$$DW = \frac{\sum_{t=2}^{n}(e_t - e_{t-1})^2}{\sum_{t=1}^{n} e_t^2}$$

t is a current sample serial number, n is a number of samples for autocorrelation test, $e_t$ and $e_{t-1}$ are sample residuals, and by testing whether a D-W result of the model is near 2, it may be determined whether errorterms of the model are independent, that is, model construction is qualified.

When the constructed model satisfies the technical validity requirement, data of the verification group is used to verify whether the prediction result of the model may reflect the real market price of NFT digital collections. A specific method is to quantify independent variable data extracted from the data of the verification group, input the data into the constructed model to obtain a predicted price, and compare a difference between the predicted price of the NFT digital collection and a real market price with a preset acceptable difference, to determine the true validity of the model. If the difference is less than the preset value, the model construction is completed and may be used to value NFT digital collections.

Figure 10:
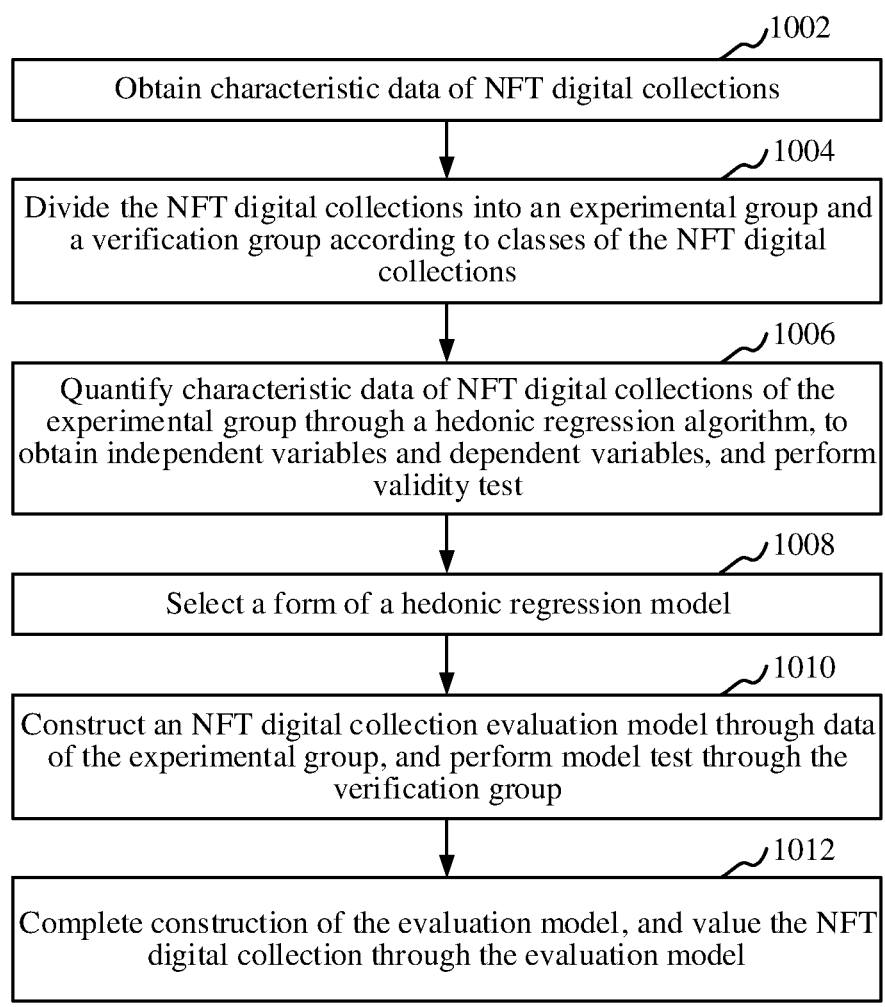
FIG. 10 is a schematic flowchart of constructing an evaluation model of an NFT digital collection according to an embodiment.

Specifically, as shown in FIG. 10, when constructing an evaluation model for NFT digital collections, a method includes: Step 1002: Obtain characteristic data of NFT digital collections. Step 1004: Divide the NFT digital collections into an experimental group and a verification group according to categories of the NFT digital collections. Step 1006: Quantify characteristic data of NFT digital collections of the experimental group through a hedonic regression algorithm, to obtain independent variables and dependent variables, and perform validity test. Step 1008: Select a form of a hedonic regression model. Step 1010: Construct an NFT digital collection evaluation model through data of the experimental group, and perform model verification through the verification group. Step 1012: Complete construction of the evaluation model, and value the NFT digital collection through the evaluation model. When specifically valuing an NFT digital collection, the NFT digital collection to be valued may be inputted, and the server identifies, according to the class label of the NFT digital collection, an evaluation model that is used for the NFT digital collection to be valued. The characteristic of the NFT digital collection to be valued is obtained, the 31 independent variable factors in Table 2 are quantified and inputted into the model, and then the predicted value of the target NFT digital asset is outputted.

The blockchain digital resource processing method provided in this embodiment uses market data to construct, through a scientific and reasonable evaluation method, an evaluation model that combines characteristics of NFT digital collections, transaction attributes, and transaction data of other investment products, which can improve the evaluation accuracy of NFT digital collections and can provide effective means of price discovery for individual investors and institutional investors in the secondary market.

Although the steps are displayed sequentially according to the instructions of the arrows in the flowcharts of the embodiments, these steps are not necessarily performed sequentially according to the sequence instructed by the arrows. Unless otherwise explicitly specified in the present disclosure, execution of the steps is not strictly limited, and the steps may be performed in other sequences. Moreover, at least some of the steps in flowcharts in each embodiment may include a plurality of sub-steps or a plurality of stages. The steps or stages are not necessarily performed at the same moment but may be performed at different moments. Execution of the steps or stages is not necessarily sequentially performed, but may be performed alternately with other steps or at least some steps or stages of other steps.

Based on the same inventive concept, an embodiment of the present disclosure further provides a blockchain digital resource processing apparatus for implementing the above-mentioned blockchain digital resource processing method. The implementation solution to the problem provided by the apparatus is similar to the implementation solution described in the above method. Therefore, for specific definitions in one or more embodiments of the blockchain digital resource processing apparatus provided below, refer to the above definitions in the blockchain digital resource processing method. Details are not repeated herein.

Figure 11:
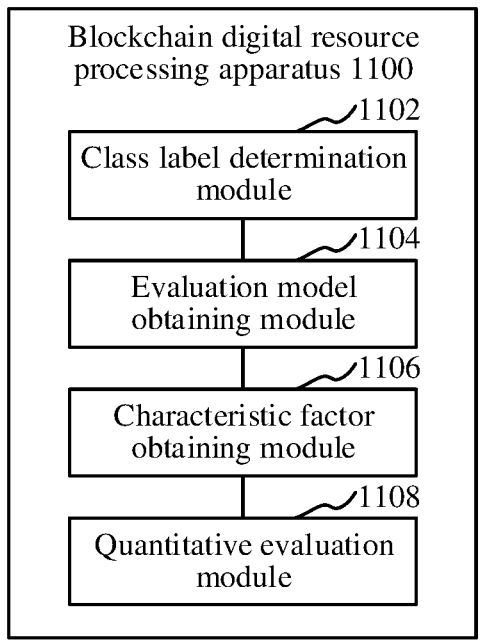
FIG. 11 is a structural block diagram of a blockchain digital resource processing apparatus according to an embodiment.

In an embodiment, as shown in FIG. 11, a blockchain digital resource processing apparatus 1100 is provided, including: a class label determination module 1102, an evaluation model obtaining module 1104, a characteristic factor obtaining module 1106, and a quantitative evaluation module 1108.

The class label determination module 1102 is configured to determine a class label of a blockchain-based target digital resource.

The evaluation model obtaining module 1104 is configured to obtain a resource quantitative evaluation model that matches the class label. The resource quantitative evaluation model is constructed through regression fitting based on a historical digital resource having the class label.

The characteristic factor obtaining module 1106 is configured to obtain an evaluation characteristic factor of the target digital resource according to an input characteristic condition of the resource quantitative evaluation model.

The quantitative evaluation module 1108 is configured to input the evaluation characteristic factor into the resource quantitative evaluation model for quantitative evaluation, to obtain a quantitative evaluation result for representing an exchange attribute of the target digital resource.

In an embodiment, the characteristic factor obtaining module 1106 includes a characteristic condition obtaining module, an evaluation characteristic determination module, and a characteristic conversion module. The characteristic condition obtaining module is configured to obtain resource characteristic information of the target digital resource and an input characteristic condition of the resource quantitative evaluation model. The evaluation characteristic determination module is configured to determine evaluation characteristic information from the resource characteristic information according to the input characteristic condition. The characteristic conversion module is configured to perform characteristic conversion on the evaluation characteristic information to obtain an evaluation characteristic factor of the target digital resource.

In an embodiment, the characteristic conversion module is further configured to perform quantitative processing on evaluation characteristic information satisfying a data continuity condition in the evaluation characteristic information, to obtain a continuous evaluation characteristic factor; perform quantitative processing on evaluation characteristic information not satisfying a data continuity condition in the evaluation characteristic information, to obtain a discontinuous evaluation characteristic factor; and obtain the evaluation characteristic factor of the target digital resource according to the continuous evaluation characteristic factor and the discontinuous evaluation characteristic factor.

In an embodiment, the class label determination module 1102 includes a target digital resource determination module and an attribute information processing module. The target digital resource determination module is configured to determine the blockchain-based target digital resource to be evaluated. The attribute information processing module is configured to obtain attribute information of the target digital resource, and determine a class label of the target digital resource according to the attribute information.

In an embodiment, the apparatus further includes a characteristic information obtaining module, a regression fitting module, a fitting result obtaining module, a fitting method selection module, and a model construction module. The characteristic information obtaining module is configured to obtain resource characteristic information of a historical digital resource of a class label. The regression fitting module is configured to fit based on the resource characteristic information through multiple regression fitting methods, to obtain a quantitative attribute of the historical digital resource. The fitting result obtaining module is configured to obtain fitting results of the multiple regression fitting methods based on a history exchange attribute of the historical digital resource and quantitative attributes obtained through fitting based on the multiple regression fitting methods. The fitting method selection module is configured to select a target regression fitting method from the multiple regression fitting methods according to the fitting results of the multiple regression fitting methods. The model construction module is configured to construct a resource quantitative evaluation model based on the target regression fitting method.

In an embodiment, the regression fitting module includes a quantitative processing module, a factor testing module, and a target factor fitting module. The quantitative processing module is configured to perform quantitative processing on resource characteristic information to obtain resource characteristic factors. The factor test module is configured to test the resource characteristic factors and obtain a target characteristic factor from the resource characteristic factors based on a test result. The target factor fitting module is configured to fit based on the target characteristic factor through multiple regression fitting methods, to obtain a quantitative attribute of the historical digital resource.

In an embodiment, the factor test module is further configured to perform variance analysis on the resource characteristic factors to obtain a variance analysis result; and determine a resource characteristic factor of the resource characteristic factors whose variance analysis result satisfies a factor validity determination condition as the target characteristic factor.

In an embodiment, the fitting result obtaining module is further configured to obtain fitting degree parameters of the multiple regression fitting methods based on differences between a history exchange attribute of the historical digital resource and quantitative attributes obtained through fitting based on the multiple regression fitting methods. The fitting method selection module is further configured to determine a target fitting degree parameter that satisfies a model construction condition from fitting degree parameters of the multiple regression fitting methods; and determine a regression fitting method of the multiple regression fitting methods that matches the target fitting degree parameter as the target regression fitting method.

In an embodiment, the characteristic information obtaining module includes a history resource determination module, a transfer record tracing module, and a history characteristic information obtaining module. The history resource determination module is configured to determine the historical digital resource having the class label, and obtain description information of the historical digital resource. The transfer record tracing module is configured to trace a resource transfer history record of the historical digital resource in a target blockchain to which the historical digital resource belongs, to obtain transfer information of the historical digital resource. The history characteristic information obtaining module is configured to obtain resource characteristic information of the historical digital resource according to the description information and the transfer information.

In an embodiment, the transfer record tracing module is further configured to obtain current address information of the historical digital resource in the target blockchain to which the historical digital resource belongs; determine a current block to which the current address information belongs; trace a generation record of the current block in the target blockchain to obtain a resource transfer history record of the historical digital resource; and obtain the transfer information of the historical digital resource according to the resource transfer history record.

In an embodiment, the model construction module is further configured to construct an initial resource quantitative evaluation model based on the target regression fitting method; and train the initial resource quantitative evaluation model based on the resource characteristic information of the historical digital resource until the training ends, to obtain the resource quantitative evaluation model.

In an embodiment, the apparatus further includes a verification characteristic information obtaining module and a model verification module. The verification characteristic information obtaining module is configured to obtain verification resource characteristic information of a verification resource group of the class label. The model verification module performs model verification on the resource quantitative evaluation model based on the verification resource characteristic information and a model verification condition, to obtain a model verification result; and returns to the step of constructing the resource quantitative evaluation model based on the target regression fitting method in response to that the model verification result is that the test fails, until the resource quantitative evaluation model passes the model verification.

In an embodiment, the characteristic information obtaining module is further configured to divide the historical digital resource having the class label into an experimental resource group and a verification resource group, and obtain resource characteristic information of the experimental resource group. The regression fitting module is further configured to fit based on the resource characteristic information through multiple regression fitting methods, to obtain a quantitative attribute of the experimental resource group. The fitting result obtaining module is further configured to obtain fitting results of the multiple regression fitting methods based on a history exchange attribute of the experimental resource group and quantitative attributes obtained through fitting based on the multiple regression fitting methods.

In an embodiment, the characteristic information obtaining module is further configured to determine the historical digital resource having the class label; divide the historical digital resource into an experimental resource group and a verification resource group; and in response to that an inter-group difference between the experimental resource group and the verification resource group does not satisfy an inter-group difference condition, return to the step of dividing the historical digital resource into the experimental resource group and the verification resource group until the inter-group difference between the experimental resource group and the verification resource group satisfies the inter-group difference condition.

Based on the same inventive concept, an embodiment of the present disclosure further provides a blockchain-based resource quantitative evaluation model processing apparatus for implementing the above-mentioned blockchain-based resource quantitative evaluation model processing method. The implementation solution to the problem provided by the apparatus is similar to the implementation solution described in the above method. Therefore, for specific definitions in one or more embodiments of the blockchain-based resource quantitative evaluation model processing apparatus provided below, refer to the above definitions in the blockchain-based resource quantitative evaluation model processing method. Details are not repeated herein.

Figure 12:
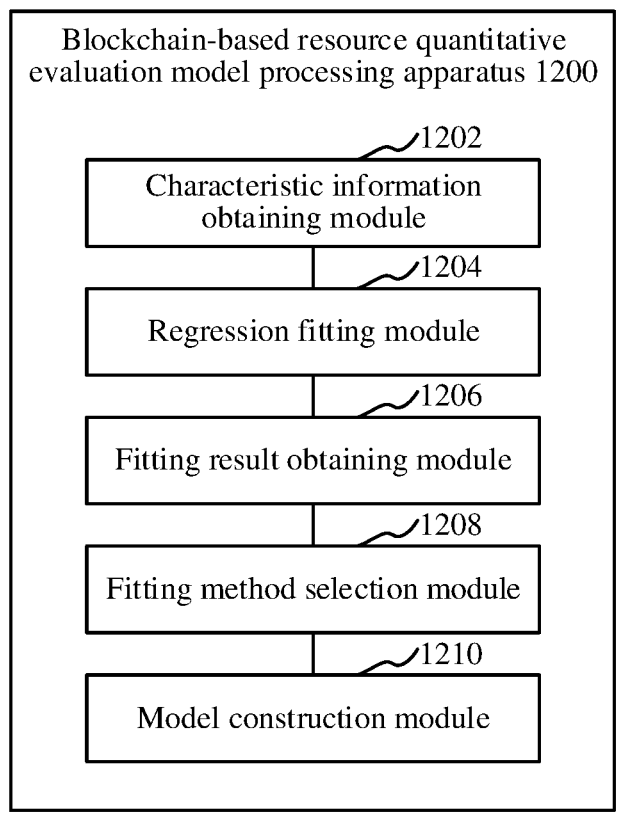
FIG. 12 is a structural block diagram of a blockchain-based resource quantitative evaluation model processing apparatus according to an embodiment.

In an embodiment, as shown in FIG. 12, a blockchain-based resource quantitative evaluation model processing apparatus 1200 is provided, including: a characteristic information obtaining module 1202, a regression fitting module 1204, a fitting result obtaining module 1206, a fitting method selection module 1208, and a model construction module 1210.

The characteristic information obtaining module 1202 is configured to obtain resource characteristic information of a blockchain-based historical digital resource of a target class label.

The regression fitting module 1204 is configured to fit based on the resource characteristic information through multiple regression fitting methods, to obtain a quantitative attribute of the historical digital resource.

The fitting result obtaining module 1206 is configured to obtain fitting results of the multiple regression fitting methods based on a history exchange attribute of the historical digital resource and quantitative attributes obtained through fitting based on the multiple regression fitting methods.

The fitting method selection module 1208 is configured to select a target regression fitting method from the multiple regression fitting methods according to the fitting results of the multiple regression fitting methods.

The model construction module 1210 is configured to construct, based on the target regression fitting method, a resource quantitative evaluation model that matches the target class label. The resource quantitative evaluation model is used to quantitatively evaluate a blockchain-based target digital resource of the target class label, to obtain a quantitative evaluation result for representing an exchange attribute of the target digital resource.

In an embodiment, the regression fitting module 1204 includes a quantitative processing module, a factor test module, and a target factor fitting module. The quantitative processing module is configured to perform quantitative processing on resource characteristic information to obtain resource characteristic factors. The factor test module is configured to test the resource characteristic factors and obtain a target characteristic factor from the resource characteristic factors based on a test result. The target factor fitting module is configured to fit based on the target characteristic factor through multiple regression fitting methods, to obtain a quantitative attribute of the historical digital resource.

Each module in the blockchain digital resource processing apparatus and the blockchain-based resource quantitative evaluation model processing apparatus may be realized in whole or in part by software, hardware, and combinations thereof. The above-mentioned modules may be embedded in the processor in the computer device in the form of hardware or independent of the processor in the computer device, and may also be stored in the memory of the computer device in the form of software, so that the processor may invoke and execute the corresponding operations of the above-mentioned modules.

In an embodiment, a computer device is provided and may be a server. An internal structure thereof may be shown in FIG. 13. The computer device includes a processor, a memory, an input/output interface (I/O for short), and a communication interface. The processor, the memory, and the input/output interface are connected through a system bus, and the communication interface is connected to the system bus through the input/output interface. The processor of the computer device is configured to provide computation and control ability. The memory of the computer device includes a non-volatile storage medium and an inner memory. The non-volatile storage medium stores an operating system, computer-readable instructions, and databases. The inner memory provides an operating environment for the operating system and the computer-readable instructions in the non-volatile storage medium. The database of the computer device is configured to store resource quantitative evaluation model data. The input/output interface of the computer device is configured to exchange information between the processor and external devices. The communication interface of the computer device is configured to communicate with an external terminal by using a network connection. When the computer-readable instructions are executed by the processor, a blockchain digital resource processing method or a blockchain-based resource quantitative evaluation model processing method is implemented.

Figure 13:
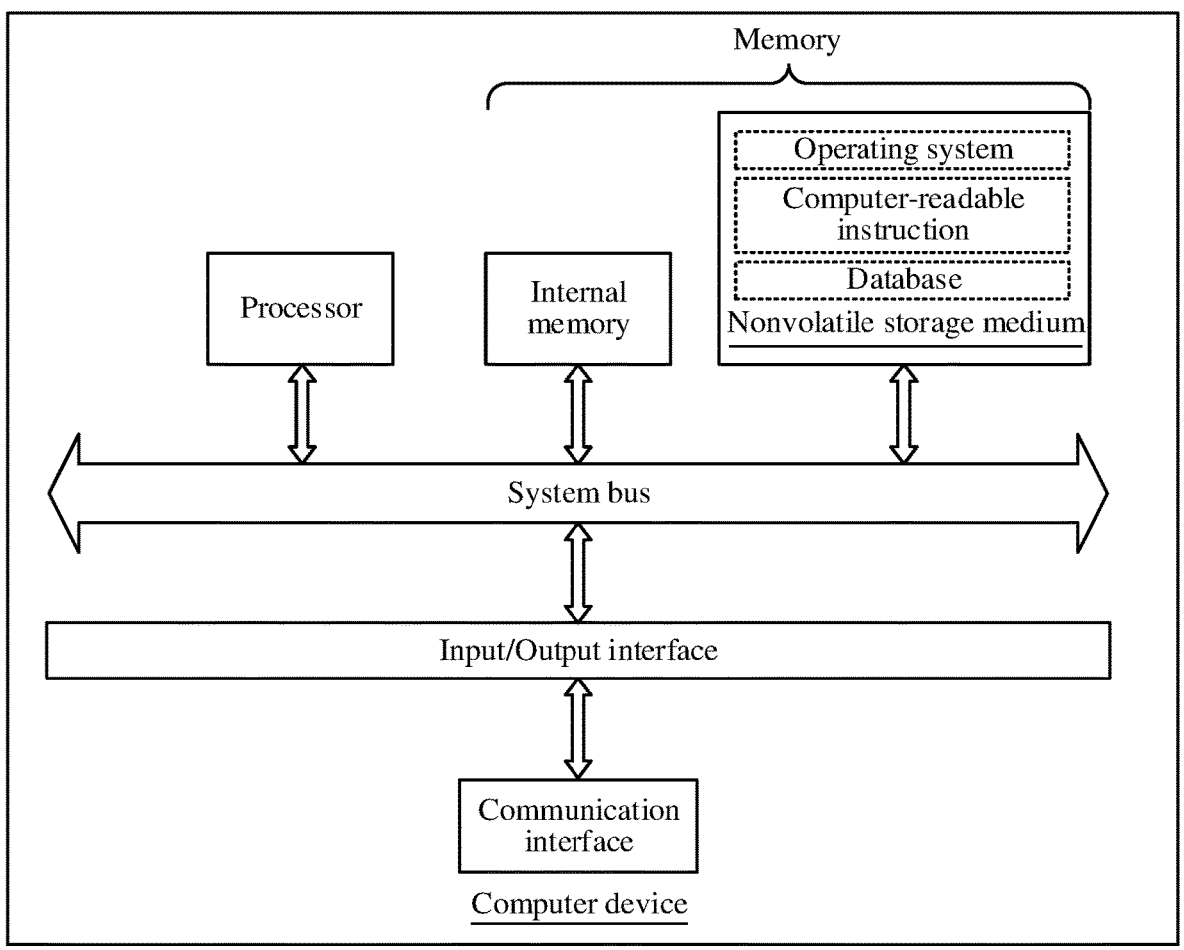
FIG. 13 is a diagram of an internal structure of a computer device according to an embodiment.

A person skilled in the art may understand that, the structure shown in FIG. 13 is merely a block diagram of a partial structure related to a solution in the present disclosure, and does not constitute a limitation to the computer device to which the solution in the present disclosure is applied. Specifically, the computer device may include more components or fewer components than those shown in the figure, or some components may be combined, or a different component deployment may be used.

In an embodiment, a computer device is further provided, including: a memory and a processor, the memory stores computer-readable instructions, and the computer-readable instructions, when executed by the processor, performs the steps of the foregoing method embodiments.

In an embodiment, a computer-readable storage medium is provided, and stores computer-readable instructions. The computer-readable instructions, when executed by the processor, perform the steps of the foregoing method embodiments.

In an embodiment, a computer program product is provided, and includes computer-readable instructions stored in a computer-readable storage medium. A processor of a computer device reads the computer-readable instructions from the computer-readable storage medium, and the processor executes the computer-readable instructions, so that the computer device performs the steps of the foregoing method embodiments.

The user information (including but not limited to user equipment information, user personal information, or the like) and data (including but not limited to data used for analysis, stored data, displayed data, or the like) involved in the present disclosure are information and data that are authorized by the user or that have been fully authorized by all parties, and the collection, use and processing of relevant data need to comply with relevant laws, regulations and standards of relevant countries and regions.

A person of ordinary skill in the art may understand that all or some of procedures of the method in the foregoing embodiments may be implemented by a computer-readable instruction instructing relevant hardware. The computer-readable instruction may be stored in a non-volatile computer-readable storage medium. When the computer-readable instruction is executed, the procedures of the foregoing method embodiments may be implemented. References to the memory, the database, or other medium used in the embodiments provided in the present disclosure may all include a non-volatile or a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, or the like. The volatile memory may be a random access memory (RAM) or an external cache. As an illustration and not a limitation, the RAM may be in various forms, such as a static random access memory (SRAM) or a dynamic random access memory (DRAM). The database involved in the various embodiments provided in the present disclosure may include at least one of a relational database and a non-relational database. The non-relational database may include a blockchain-based distributed database or the like, but is not limited thereto. The processors involved in the various embodiments provided by the present disclosure may be general-purpose processors, central processing units, graphics processors, digital signal processors, programmable logic devices, data processing logic devices based on quantum computing, and are not limited thereto.

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

The foregoing embodiments show only several implementations of the present disclosure and are described in detail, which, however, are not to be construed as a limitation to the patent scope of the present disclosure. For a person of ordinary skill in the art, several transformations and improvements may be made without departing from the idea of the present disclosure. These transformations and improvements belong to the protection scope of the present disclosure. Therefore, the protection scope of the present disclosure shall be subject to the appended claims.

What is claimed is:

1. A blockchain digital resource processing method, executed by a computer device, the method comprising:
    determining, at a class label determination module, a class label of a blockchain-based target digital resource;
    obtaining, at an evaluation model obtaining module, a resource quantitative evaluation model that matches the class label; the resource quantitative evaluation model being constructed through regression fitting based on a historical digital resource having the same class label;
    obtaining, at a characteristic factor obtaining module, an evaluation characteristic factor of the target digital resource according to an input characteristic condition of the resource quantitative evaluation model; and
    inputting, at a quantitative evaluation module, the evaluation characteristic factor into the resource quantitative evaluation model for quantitative evaluation, to obtain a quantitative evaluation result for representing an exchange attribute of the target digital resource.

2. The method according to claim 1, wherein the obtaining an evaluation characteristic factor of the target digital resource according to an input characteristic condition of the resource quantitative evaluation model comprises:
    obtaining resource characteristic information of the target digital resource and an input characteristic condition of the resource quantitative evaluation model;
    determining evaluation characteristic information from the resource characteristic information according to the input characteristic condition; and
    performing characteristic conversion on the evaluation characteristic information to obtain an evaluation characteristic factor of the target digital resource.

3. The method according to claim 2, wherein the performing characteristic conversion on the evaluation characteristic information to obtain an evaluation characteristic factor of the target digital resource comprises:
    performing quantitative processing on evaluation characteristic information satisfying a data continuity condition in the evaluation characteristic information, to obtain a continuous evaluation characteristic factor;
    performing quantitative processing on evaluation characteristic information not satisfying a data continuity condition in the evaluation characteristic information, to obtain a discontinuous evaluation characteristic factor; and
    obtaining the evaluation characteristic factor of the target digital resource according to the continuous evaluation characteristic factor and the discontinuous evaluation characteristic factor.

4. The method according to claim 1, wherein the determining a class label of a blockchain-based target digital resource comprises:
    determining the blockchain-based target digital resource to be evaluated; and
    obtaining attribute information of the target digital resource, and determining a class label of the target digital resource according to the attribute information.

5. The method according to claim 1, wherein, the resource quantitative evaluation model is obtained by:
    obtaining, at a characteristic information obtaining module, resource characteristic information of the historical digital resource having the same class label;
    fitting, at a regression fitting module, based on the resource characteristic information through multiple regression fitting methods, to obtain a quantitative attribute of the historical digital resource;
    obtaining, at a fitting result obtaining module, fitting results of the multiple regression fitting methods based on a history exchange attribute of the historical digital resource and quantitative attributes obtained through fitting based on the multiple regression fitting methods;

selecting, at a fitting method selection module, a target regression fitting method from the multiple regression fitting methods according to the fitting results of the multiple regression fitting methods; and constructing, at a model construction module, based on the target regression fitting method, a resource quantitative evaluation model.

6. The method according to claim 5, wherein the fitting based on the resource characteristic information through multiple regression fitting methods, to obtain a quantitative attribute of the historical digital resource comprises:

performing quantitative processing on resource characteristic information to obtain resource characteristic factors;

testing the resource characteristic factors and obtaining a target characteristic factor from the resource characteristic factors based on a test result; and fitting based on the target characteristic factor through multiple regression fitting methods, to obtain a quantitative attribute of the historical digital resource.

7. The method according to claim 6, wherein the testing the resource characteristic factors and obtaining a target characteristic factor from the resource characteristic factors based on a test result comprises:

performing variance analysis on the resource characteristic factors to obtain a variance analysis result; and determining a resource characteristic factor of the resource characteristic factors whose variance analysis result satisfies a factor validity determination condition as the target characteristic factor.

8. The method according to claim 5, wherein the obtaining fitting results of the multiple regression fitting methods based on a history exchange attribute of the historical digital resource and quantitative attributes obtained through fitting based on the multiple regression fitting methods comprises:

obtaining fitting degree parameters of the multiple regression fitting methods based on differences between a history exchange attribute of the historical digital resource and quantitative attributes obtained through fitting based on the multiple regression fitting methods; and the selecting a target regression fitting method from the multiple regression fitting methods according to the fitting results of the multiple regression fitting methods comprises:

determining a target fitting degree parameter that satisfies a model construction condition from fitting degree parameters of the multiple regression fitting methods; and determining a regression fitting method of the multiple regression fitting methods that matches the target fitting degree parameter as the target regression fitting method.

9. The method according to claim 5, wherein the obtaining resource characteristic information of a historical digital resource having the class label comprises:

determining the historical digital resource having the class label, and obtaining description information of the historical digital resource;

tracing a resource transfer history record of the historical digital resource in a target blockchain to which the historical digital resource belongs, to obtain transfer information of the historical digital resource; and obtaining resource characteristic information of the historical digital resource according to the description information and the transfer information.

10. The method according to claim 9, wherein the tracing a resource transfer history record of the historical digital resource in a target blockchain to which the historical digital resource belongs, to obtain transfer information of the historical digital resource comprises:

obtaining current address information of the historical digital resource in the target blockchain to which the historical digital resource belongs;

determining a current block to which the current address information belongs;

tracing a generation record of the current block in the target blockchain to obtain a resource transfer history record of the historical digital resource; and obtaining the transfer information of the historical digital resource according to the resource transfer history record.

11. The method according to claim 5, wherein the constructing, based on the target regression fitting method, a resource quantitative evaluation model comprises:

constructing, based on the target regression fitting method, an initial resource quantitative evaluation model; and training the initial resource quantitative evaluation model based on the resource characteristic information of the historical digital resource until the training ends, to obtain the resource quantitative evaluation model.

12. The method according to claim 5, wherein the method further comprises:

obtaining verification resource characteristic information of a verification resource group of the class label;

performing model verification on the resource quantitative evaluation model based on the verification resource characteristic information and a model verification condition, to obtain a model verification result; and returning to the operation of constructing the resource quantitative evaluation model based on the target regression fitting method in response to that the model verification result is that the testing fails, until the resource quantitative evaluation model passes the model verification.

13. The method according to claim 12, wherein the obtaining resource characteristic information of a historical digital resource having the class label comprises:

dividing the historical digital resource having the class label into an experimental resource group and a verification resource group, and obtaining resource characteristic information of the experimental resource group;

the fitting based on the resource characteristic information through multiple regression fitting methods, to obtain a quantitative attribute of the historical digital resource comprises:

fitting based on the resource characteristic information through multiple regression fitting methods, to obtain a quantitative attribute of the experimental resource group; and the obtaining fitting results of the multiple regression fitting methods based on a history exchange attribute of the historical digital resource and quantitative attributes obtained through fitting based on the multiple regression fitting methods comprises:

obtaining fitting results of the multiple regression fitting methods based on a history exchange attribute of the experimental resource group and quantitative attributes obtained through fitting based on the multiple regression fitting methods.

14. The method according to claim 13, wherein the dividing the historical digital resource having the class label into an experimental resource group and a verification resource group comprises:
   determining the historical digital resources having the class label;
   dividing the historical digital resources into the experimental resource group and the verification resource group; and
   in response to that an inter-group difference between the experimental resource group and the verification resource group does not satisfy an inter-group difference condition, returning to the operation of dividing the historical digital resources into the experimental resource group and the verification resource group until the inter-group difference between the experimental resource group and the verification resource group satisfies the inter-group difference condition.

15. A blockchain digital resource processing apparatus, the apparatus comprising:
   at least one memory and at least one processor, the at least one memory storing computer-readable instructions; and the at least one processor are configured to execute the computer-readable instructions and perform:
   determining, at a class label determination module, a class label of a blockchain-based target digital resource;
   obtaining, at an evaluation model obtaining module, a resource quantitative evaluation model that matches the class label; the resource quantitative evaluation model being constructed through regression fitting based on a historical digital resource having the same class label;
   obtaining, at a characteristic factor obtaining module, an evaluation characteristic factor of the target digital resource according to an input characteristic condition of the resource quantitative evaluation model; and
   inputting, at a quantitative evaluation module, the evaluation characteristic factor into the resource quantitative evaluation model for quantitative evaluation, to obtain a quantitative evaluation result for representing an exchange attribute of the target digital resource.

16. The apparatus according to claim 15, wherein the obtaining an evaluation characteristic factor of the target digital resource according to an input characteristic condition of the resource quantitative evaluation model comprises:
   obtaining resource characteristic information of the target digital resource and an input characteristic condition of the resource quantitative evaluation model;
   determining evaluation characteristic information from the resource characteristic information according to the input characteristic condition; and
   performing characteristic conversion on the evaluation characteristic information to obtain an evaluation characteristic factor of the target digital resource.

17. The apparatus according to claim 16, wherein the performing characteristic conversion on the evaluation characteristic information to obtain an evaluation characteristic factor of the target digital resource comprises:
   performing quantitative processing on evaluation characteristic information satisfying a data continuity condition in the evaluation characteristic information, to obtain a continuous evaluation characteristic factor;
   performing quantitative processing on evaluation characteristic information not satisfying a data continuity condition in the evaluation characteristic information, to obtain a discontinuous evaluation characteristic factor; and
   obtaining the evaluation characteristic factor of the target digital resource according to the continuous evaluation characteristic factor and the discontinuous evaluation characteristic factor.

18. The apparatus according to claim 15, wherein the determining a class label of a blockchain-based target digital resource comprises:
   determining the blockchain-based target digital resource to be evaluated; and
   obtaining attribute information of the target digital resource, and determining a class label of the target digital resource according to the attribute information.

19. The apparatus according to claim 15, wherein, the resource quantitative evaluation model is obtained by:
   obtaining, at a characteristic information obtaining module, resource characteristic information of the historical digital resource having the same class label;
   fitting, at a regression fitting module, based on the resource characteristic information through multiple regression fitting methods, to obtain a quantitative attribute of the historical digital resource;
   obtaining, at a fitting result obtaining module, fitting results of the multiple regression fitting methods based on a history exchange attribute of the historical digital resource and quantitative attributes obtained through fitting based on the multiple regression fitting methods;
   selecting, at a fitting method selection module, a target regression fitting method from the multiple regression fitting methods according to the fitting results of the multiple regression fitting methods; and
   constructing, at a model construction module, based on the target regression fitting method, a resource quantitative evaluation model.

20. A non-transitory computer-readable storage medium, storing computer-executable instructions, and when executed by at least one processor, the computer-readable instructions cause the at least one processor to perform:
   determining, at a class label determination module, a class label of a blockchain-based target digital resource;
   obtaining, at an evaluation model obtaining module, a resource quantitative evaluation model that matches the class label; the resource quantitative evaluation model being constructed through regression fitting based on a historical digital resource having the same class label;
   obtaining, at a characteristic factor obtaining module, an evaluation characteristic factor of the target digital resource according to an input characteristic condition of the resource quantitative evaluation model; and
   inputting, at a quantitative evaluation module, the evaluation characteristic factor into the resource quantitative evaluation model for quantitative evaluation, to obtain a quantitative evaluation result for representing an exchange attribute of the target digital resource.

\* \* \* \* \*